(12) United States Patent
Shimamura et al.

(10) Patent No.: US 8,801,156 B2
(45) Date of Patent: Aug. 12, 2014

(54) FLOW PASSAGE ASSEMBLY AND METHOD FOR MANUFACTURING FLOW PASSAGE ASSEMBLY, INKJET RECORDING HEAD, AND RECORDING APPARATUS

(75) Inventors: Ryo Shimamura, Yokohama (JP); Takeshi Shibata, Yokohama (JP); Akira Yamamoto, Yokohama (JP); Toshiaki Hirosawa, Hiratsuka (JP); Hiroki Tajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/464,685

(22) Filed: May 4, 2012

(65) Prior Publication Data

US 2012/0293588 A1  Nov. 22, 2012

(30) Foreign Application Priority Data

May 16, 2011  (JP) .................... 2011-109459
Jul. 13, 2011  (JP) .................... 2011-154911

(51) Int. Cl.
  *B41J 2/17*  (2006.01)
(52) U.S. Cl.
  USPC .......................................... 347/84
(58) Field of Classification Search
  CPC ....... B41J 2201/19; B41J 2201/22; B41J 2/17
  USPC ............ 347/84; 429/26, 38; 29/623
  See application file for complete search history.

(56) References Cited

U.S. PATENT DOCUMENTS

| 4,529,100 | A | 7/1985 | Ingemann | |
| 7,261,397 | B2 * | 8/2007 | Morita | 347/84 |
| 2004/0151972 | A1 * | 8/2004 | Turpin et al. | 429/38 |
| 2005/0068381 | A1 | 3/2005 | Morita | |
| 2009/0152326 | A1 * | 6/2009 | Shin et al. | 228/110.1 |

FOREIGN PATENT DOCUMENTS

| GB | 2136783 | * | 3/1984 | B65D 17/40 |
| GB | 2136783 | A | 9/1984 | |
| JP | 63-203318 | A | 8/1988 | |
| JP | 3003335 | U | 8/1994 | |
| JP | 2000-203568 | A1 | 7/2000 | |
| JP | 2002-178541 | * | 6/2002 | B41J 2/175 |
| JP | 2002-178541 | A1 | 6/2002 | |
| JP | 2005-119292 | A | 5/2005 | |
| JP | 2006-068944 | A | 3/2006 | |
| JP | 2007-283668 | A | 11/2007 | |
| JP | 2008-087465 | A | 4/2008 | |

* cited by examiner

*Primary Examiner* — Alessandro Amari
*Assistant Examiner* — Michael Konczal
(74) *Attorney, Agent, or Firm* — Canon USA Inc IP Division

(57) ABSTRACT

A method for manufacturing a flow passage assembly includes forming a first flow passage in a first joint interface formed by welding a first surface of a first flow passage forming member to a first surface of a second flow passage forming member using an ultrasonic welding process, and forming, after the first flow passage is formed, a second flow passage in a second joint interface formed by welding a first surface of a third flow passage forming member to one of a second surface of the first flow passage forming member and a second surface of the second flow passage forming member using an ultrasonic welding process. A total area of weld portions used when the first flow passage is formed is greater than a total area of weld portions used when the second flow passage is formed.

12 Claims, 22 Drawing Sheets

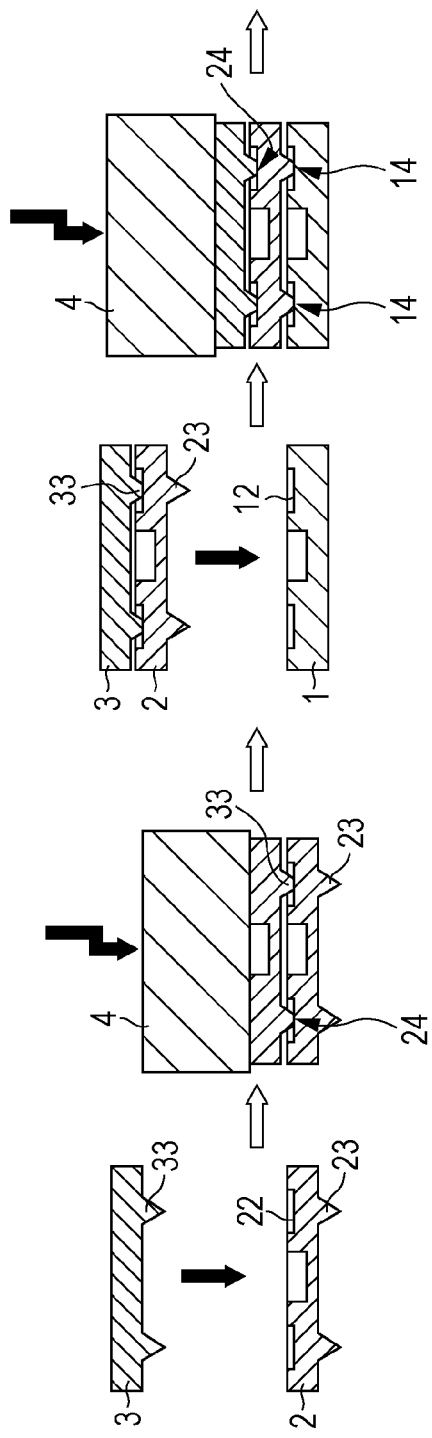

FLOW PASSAGE ASSEMBLY AND METHOD FOR MANUFACTURING FLOW PASSAGE ASSEMBLY, INKJET RECORDING HEAD, AND RECORDING APPARATUS

BACKGROUND OF THE INVENTION

1. Field of the Invention

The present disclosure relates to a flow passage assembly having a plurality of flow passage forming members stacked therein and a flow passage between every two neighboring ones of the flow passage forming members, and a method for manufacturing the flow passage assembly, an inkjet recording head, and a recording apparatus.

2. Description of the Related Art

A typical liquid ejection head for ejecting liquid is an inkjet recording head (hereinafter also simply referred to as a "recording head"). Full line recording heads have ink nozzles arranged in a range corresponding to the width of the recording medium in a direction perpendicular to a direction in which the recording medium is conveyed. Japanese Patent Laid-Open No. 2008-87465 describes a recording head including a flow passage that supplies ink thereto, a circulation flow passage, and a flow passage used for removing a bubble existing in the flow passages.

In addition, Japanese Patent Laid-Open No. 2007-283668 describes a flow passage assembly including a flow passage capable of leading liquid, such as ink, in a predetermined direction. The flow passage assembly described in Japanese Patent Laid-Open No. 2007-283668 has a structure including a first flow passage forming member having a second flow passage forming member stacked thereon.

The top surface of the first flow passage forming member of the flow passage assembly has a flow passage groove formed therein. The flow passage groove serves as a flow passage. A welding rib is formed on either side of the flow passage groove so as to extend along the flow passage groove. The bottom surface of the second flow passage forming member has a groove that receives the welding rib of the first flow passage forming member when the flow passage forming member is stacked on the first flow passage forming member. The welding rib of the first flow passage forming member is welded into the groove of the second flow passage forming member using an ultrasonic welding process.

If the first flow passage forming member and the second flow passage forming member are welded together in this manner, the flow passage groove of the first flow passage forming member is sealed with the bottom surface of the second flow passage forming member. Thus, the flow passage groove of the first flow passage forming member can function as a pipe-shaped flow passage capable of leading liquid, such as ink, along the flow passage groove. As described above, in the flow passage assembly described in Japanese Patent Laid-Open No. 2007-283668, by stacking the second flow passage forming member on the first flow passage forming member, a flow passage is formed between the first flow passage forming member and the second flow passage forming member.

In the flow passage assembly described in Japanese Patent Laid-Open No. 2007-283668, only the second flow passage forming member is stacked on the first flow passage forming member. In addition, a third flow passage forming member may be stacked on the second flow passage forming member.

In a flow passage assembly having such a structure, the top surface of the second flow passage forming member has a flow passage groove and welding ribs that are similar to those of the first flow passage forming member formed therein. In addition, the bottom surface of the third flow passage forming member has a groove that is similar to that of the second flow passage forming member formed therein. Furthermore, the welding ribs of the third flow passage forming member are welded into the groove of the first flow passage forming member using an ultrasonic welding process.

In such a flow passage assembly, a flow passage is additionally formed between the second flow passage forming member and the third flow passage forming member. In this way, two flow passages that are arranged in a vertical direction are formed in the flow passage assembly. Since the flow passage assembly includes a plurality of flow passages, the flow passage assembly can independently lead a plurality of types of liquid, such as ink, at the same time.

However, if, as described above, the flow passage assembly including a plurality of flow passages is used for a recording head, the size of the flow passage assembly is increased.

In addition, in order to manufacture the above-described first flow passage forming member, second flow passage forming member, and third flow passage forming member, the welding ribs of the first flow passage forming member are welded into the groove of the second flow passage forming member using an ultrasonic welding process in a first manufacturing step. Subsequently, in a second manufacturing step, the welding ribs of the second flow passage forming member are welded into the groove of the third flow passage forming member using an ultrasonic welding process.

Accordingly, in the second manufacturing step, the welding rib of the first flow passage forming member that is welded in the preceding step may happen to partially come off from the groove of the second flow passage forming member due to the load caused by, for example, vibration occurring when the welding ribs of the second flow passage forming member are welded into the groove of the third flow passage forming member.

Alternatively, in the first manufacturing step, the welding ribs of the second flow passage forming member may be welded into the groove of the third flow passage forming member. Subsequently, in the second manufacturing step, the welding ribs of the first flow passage forming member may be welded into the groove of the second flow passage forming member. However, in such a case, in the second manufacturing step, the welding rib of the second flow passage forming member that is welded in the first manufacturing step may happen to partially come off from the groove of the third flow passage forming member due to the load imposed when the welding ribs of the first flow passage forming member are welded into the groove of the second flow passage forming member.

As described above, in the flow passage assembly having the welding rib that comes off from the groove, liquid, such as ink, that flows through the flow passage leaks out of the portion at which the welding rib comes off.

SUMMARY OF THE INVENTION

According to an embodiment of the present invention, a method for manufacturing a flow passage assembly includes forming a first flow passage in a first joint interface formed by welding a first surface of a first flow passage forming member to a first surface of a second flow passage forming member using an ultrasonic welding process and forming, after the first flow passage is formed, a second flow passage in a second joint interface formed by welding a first surface of a third flow passage forming member to one of a second surface of the first flow passage forming member and a second surface of the second flow passage forming member using an ultrasonic welding process. A total area of weld portions used when the first flow passage is formed is greater than a total area of weld portions used when the second flow passage is formed.

According to another embodiment of the present invention, a flow passage assembly includes a first flow passage forming member, a second flow passage forming member joined to the first flow passage forming member using an ultrasonic welding process, where the second flow passage forming member has at least one first flow passage in a first joint interface formed between a first surface of the first flow passage forming member and a first surface of the second flow passage forming member, and a third flow passage forming member joined to a second surface of the second flow passage forming member opposite to the first joint interface using an ultrasonic welding process, where the third flow passage forming member has at least one second flow passage in a second joint interface formed between the second surface of the second flow passage forming member and the third flow passage forming member. A total area of weld portions used when the first flow passage is formed is greater than a total area of weld portions used when the second flow passage is formed.

Further features of the present invention will become apparent from the following description of exemplary embodiments with reference to the attached drawings.

BRIEF DESCRIPTION OF THE DRAWINGS

FIGS. 17A to 17C are cross-sectional views illustrating steps for manufacturing the flow passage assembly illustrated in FIGS. 13A and 13B.

DESCRIPTION OF THE EMBODIMENTS

Exemplary embodiments of the present disclosure are described below with reference to the accompanying drawings.

First Exemplary Embodiment

Inkjet Recording Head

Figure 1:
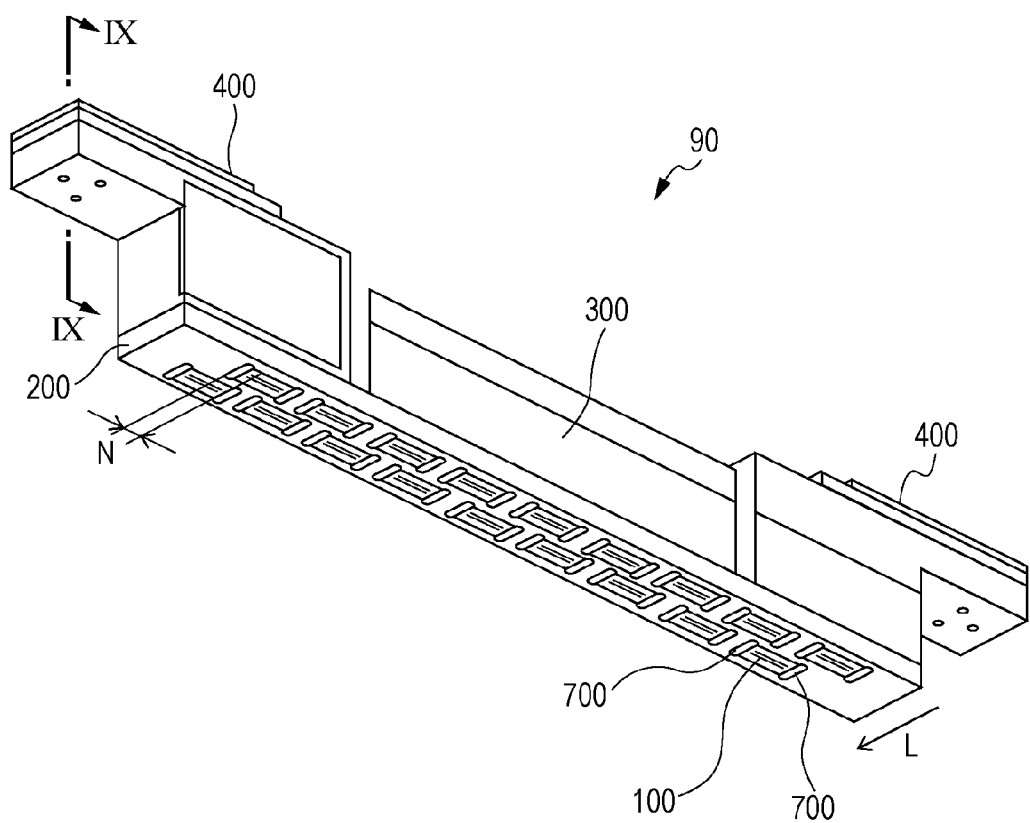
FIG. 1 is a perspective view of an inkjet recording head according to a first exemplary embodiment.
Figure 2:
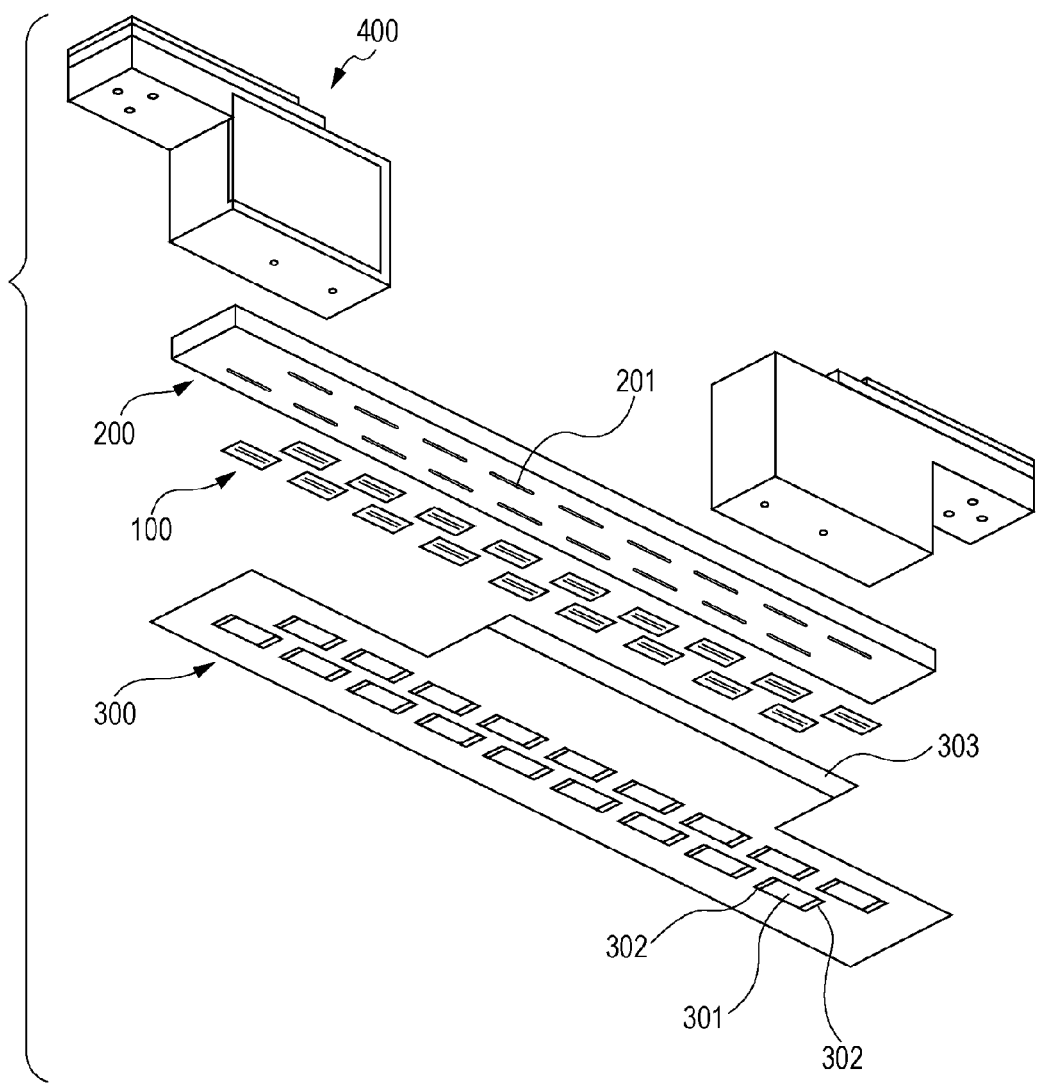
FIG. 2 is an exploded perspective view of the inkjet recording head illustrated in FIG. 1.

An exemplary structure of an inkjet recording head 90 according to a first exemplary embodiment is described next. FIGS. 1 and 2 are schematic illustrations of the structure of the inkjet recording head 90. FIG. 1 is a perspective view of the inkjet recording head 90, and FIG. 2 is an exploded perspective view of the inkjet recording head 90.

The inkjet recording head 90 can be mounted in a full line recording apparatus. The inkjet recording head 90 ejects ink from a nozzle provided in a recording element substrate 100 onto a recording medium, such as a sheet of paper, conveyed in a direction indicated by an arrow L illustrated in FIG. 1. In this way, the inkjet recording head 90 performs a recording operation on a recording medium.

As illustrated in FIGS. 1 and 2, the inkjet recording head 90 includes a plurality of the recording element substrates 100 each serving as a liquid ejection substrate, a fixing member 200, an electric wiring member 300, and an ink supply unit 400 serving as a liquid supply member. The recording element substrates 100 and the fixing member 200 onto which the recording element substrates 100 is fixed are integrated into one body and function as a liquid ejection member.

The inkjet recording head 90 includes 18 recording element substrates 100. The recording element substrates 100 are arranged on the fixing member 200 in a zigzag pattern so that an overlap region N in which the recording element substrates 100 overlap each other in a direction in which the recording medium is conveyed is formed (refer to FIG. 1). The print width of the inkjet recording head 90 that represents the width of a region in which the recording element substrates 100 are arranged is about 13 inches.

Each of the recording element substrates 100 is electrically connected to the electric wiring member 300 using, for example, wire bonding. In order to protect an electrical connecting portion of the recording element substrate 100, the electrical connecting portion is sealed with a sealing material 700. A back surface opposite to the surface of the fixing member 200 having the recording element substrates 100 mounted thereon has the ink supply unit 400 mounted thereon. The ink supply unit 400 is fixed to the back surface of the fixing member 200 using an adhesive agent or using a screw with a rubber member.

The members of the inkjet recording head 90 are described in detail next.

Figure 3A:
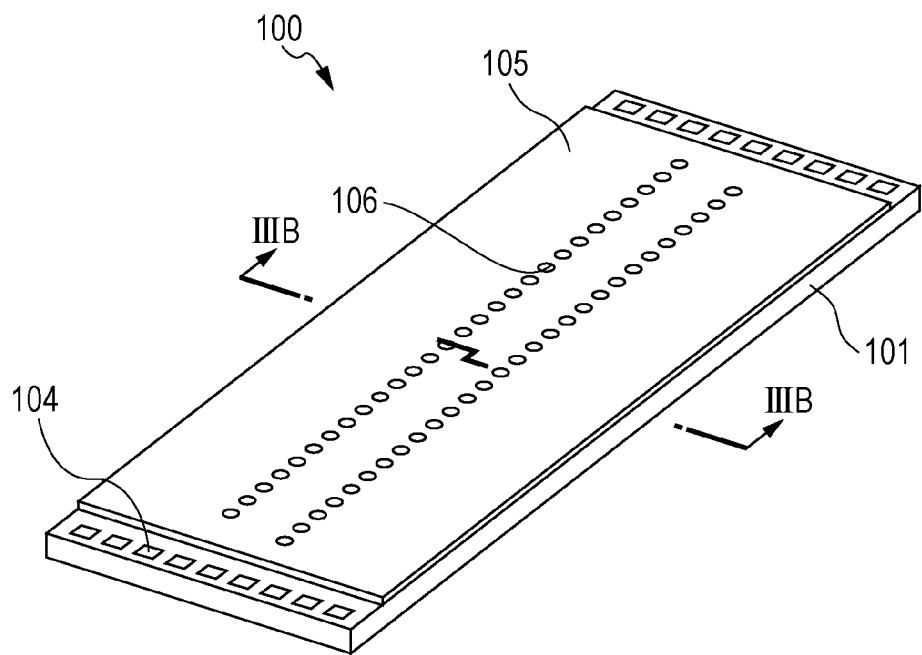
FIGS. 3A and 3B are schematic illustrations of a recording element substrate illustrated in FIG. 1.
Figure 3B:
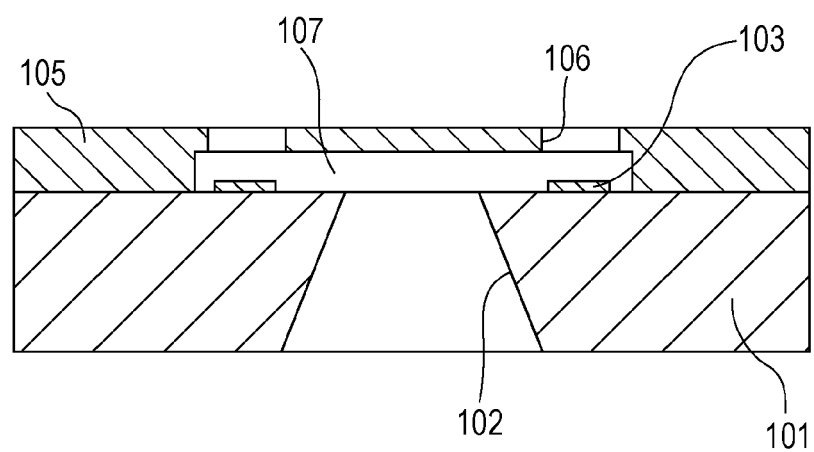

FIGS. 3A and 3B are enlarged views of the recording element substrate 100 of the inkjet recording head 90. FIG. 3A is a perspective view of the recording element substrate 100, and FIG. 3B is a cross-sectional view taken along a line IIIB-IIIB of FIG. 3A.

The recording element substrate 100 is a device for ejecting ink. As illustrated in FIG. 3B, a silicon substrate 101 has a slot-shaped ink supply port 102 formed therein. A surface of the silicon substrate 101 has a plurality of electrothermal transducers 103 serving as energy generating elements that generate energy for ejecting ink and electric wires (not illustrated), such as aluminum wires, connected to the plurality of electrothermal transducers 103. The plurality of electrothermal transducers 103 and the electric wires are formed using a deposition process.

Electrodes 104 are provided on both ends of the recording element substrate 100 in the length direction of the recording element substrate 100. The electrodes 104 are electrically connected to the electric wiring member 300 (refer to FIGS. 1 and 2). In addition, the silicon substrate 101 has a nozzle forming member 105 formed thereon. The nozzle forming member 105 is made of a polymer material.

The nozzle forming member 105 has nozzles 106 for ejecting ink at positions corresponding to the plurality of electrothermal transducers 103. In addition, the nozzle forming member 105 has an ink reservoir 107 formed therein. The ink reservoir 107 communicates with each of the nozzles 106. The nozzles 106 and the ink reservoir 107 are formed using a photolithography technique.

As illustrated in FIGS. 1 and 2, the fixing member 200 is used for fixing the recording element substrates 100 and supplying ink to each of the recording element substrates 100. The fixing member 200 has an ink flow passage formed therein. The ink flow passage is connected to the ink supply unit 400. In addition, as illustrated in FIG. 2, a surface of the fixing member 200 has openings 201 formed therein. The openings 201 are used for supplying ink to the recording element substrates 100.

As illustrated in FIGS. 1 and 2, the electric wiring member 300 transmits, to the recording element substrates 100, a drive signal transmitted from a recording apparatus (not illustrated). The electric wiring member 300 includes openings 301 used for assembling the recording element substrates 100. The electric wiring member 300 further includes electrode terminals 302 each corresponding to one of the electrodes 104 of the recording element substrates 100 and an external signal input terminal 303 used for receiving, for example, the drive signal from a recording apparatus 10.

Figure 4:
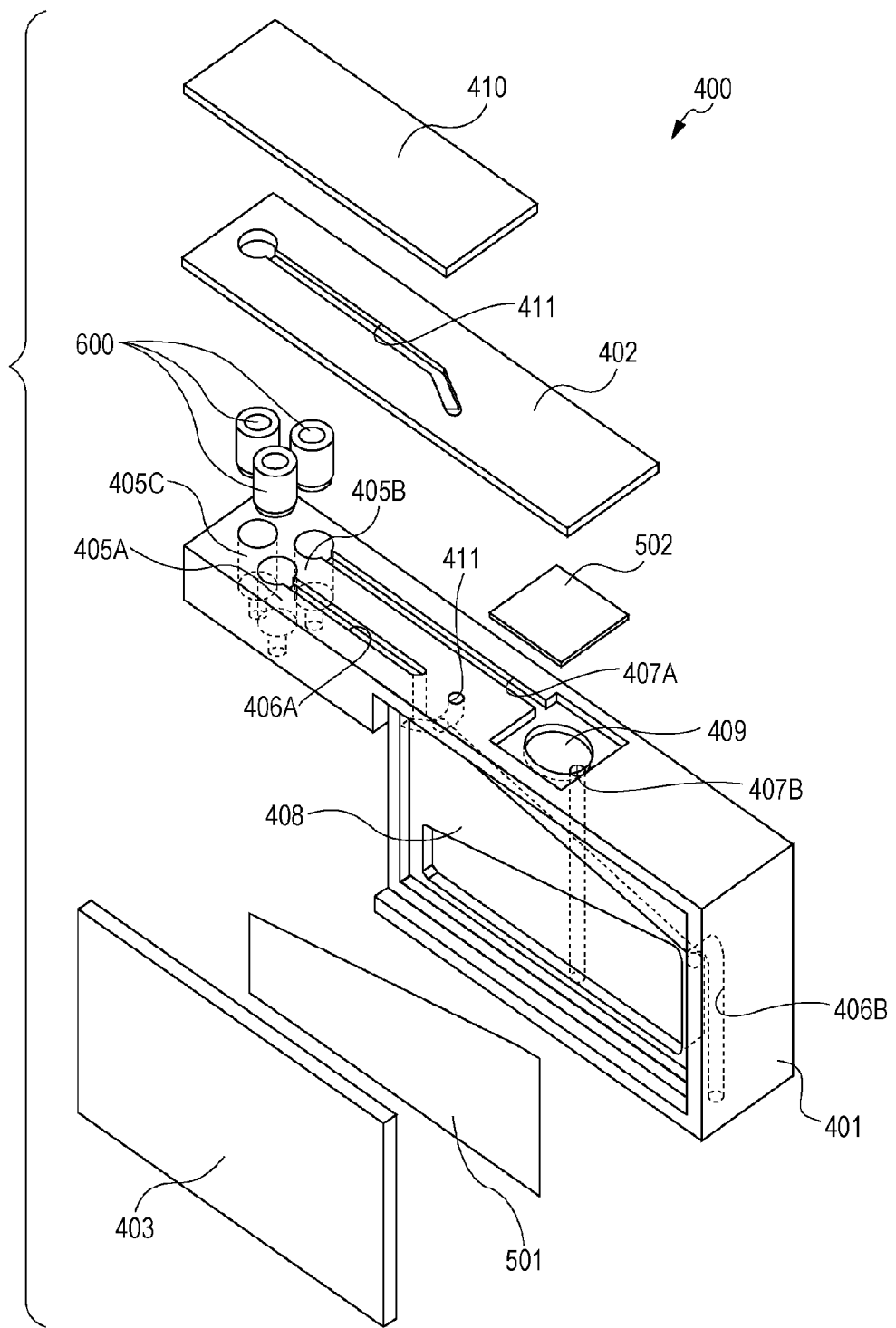
FIG. 4 is an exploded perspective view of an ink supply unit illustrated in FIG. 1.
Figure 5:
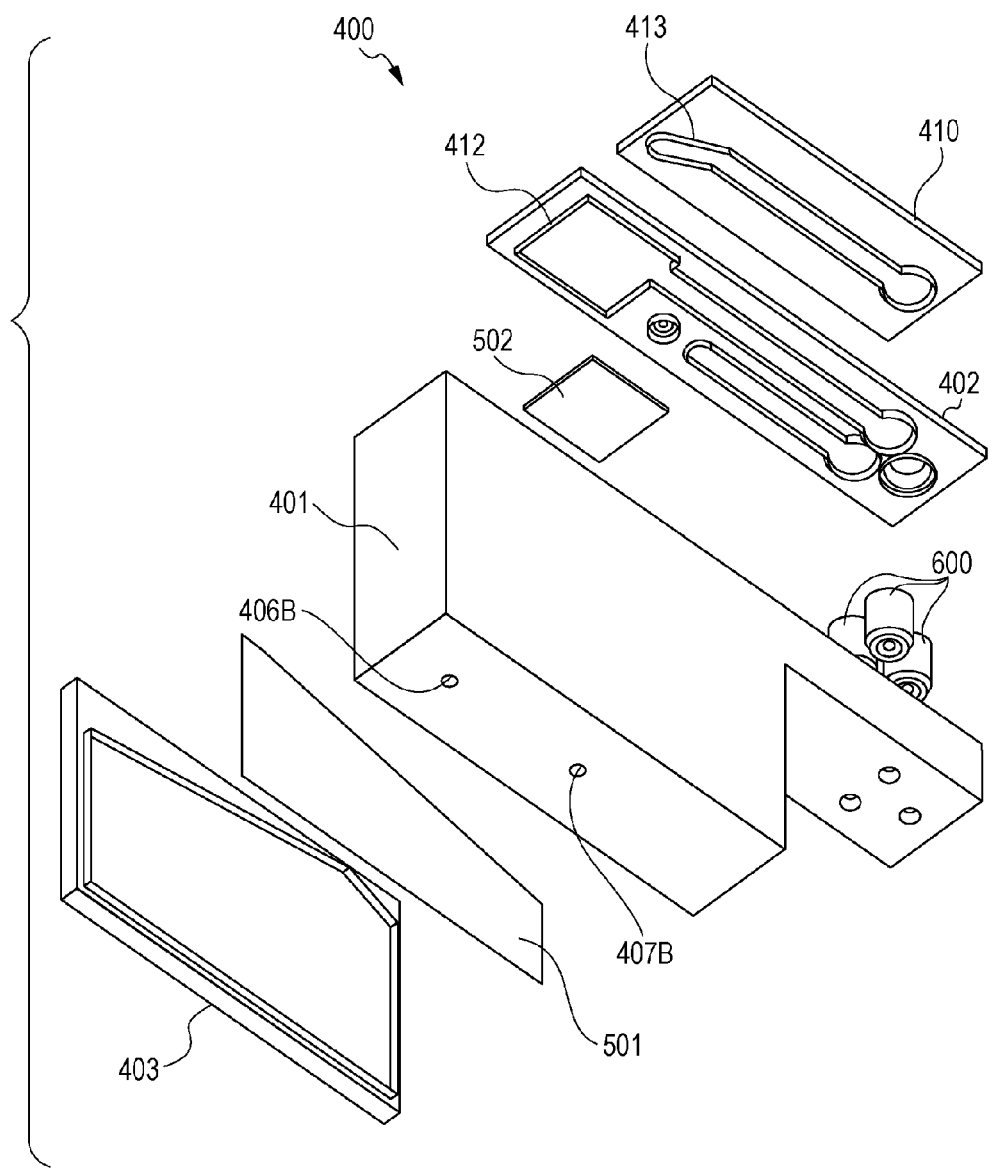
FIG. 5 is an exploded perspective view of the ink supply unit illustrated in FIG. 1.

FIGS. 4 and 5 are exploded perspective views of the ink supply unit 400 of the inkjet recording head 90. The ink supply unit 400 is connected to a recording apparatus. The ink supply unit 400 supplies ink to the recording element substrates 100 via the fixing member 200.

The ink supply unit 400 includes a filter containing member 401, a first plate 402, a second plate 410, a third plate 403, a first filter 501, a second filter 502, and joint rubbers 600. The filter containing member 401, the first plate 402, the second plate 410, and the third plate 403 are made of a polymer material using an injection molding process.

The filter containing member 401 has groove-shaped ink flow passages 406A and 407A, which are covered by the first plate 402. In addition, the first plate 402 has a groove. The groove serves as an ink flow passage 411 after the second plate 410 and the filter containing member 401 are integrated.

In addition, the filter containing member 401 has an ink flow passage 406B connected to the ink flow passage 406A. A connecting portion between the ink flow passages 406A and 406B has a first filter container 408. In addition, the filter containing member 401 includes an ink flow passage 407B connected to the ink flow passage 407A. A connecting portion between the ink flow passages 407A and 407B has a second filter container 409.

In order to protect dust particles from entering the inkjet recording head 90, the first filter container 408 and the second filter container 409 contain a first filter 501 and a second filter 502, respectively. The first filter 501 and the second filter 502 are thermal bonded to the first filter container 408 and the second filter container 409, respectively.

In addition, in the inkjet recording head 90, each of the joint rubbers 600 is press-fitted to one of joint rubber containers 405A, 405B, and 405C. When the inkjet recording head 90 is attached to a recording apparatus, the inkjet recording head 90 is connected to ink joint pipes (not illustrated) provided in the recording apparatus via the joint rubbers 600.

As illustrated in FIGS. 4 and 5, when the ink supply unit 400 is assembled, the first plate 402 and the third plate 403 are joined to the filter containing member 401. The second plate 410 is joined to the first plate 402.

Structure of Ink Flow Passage

Figure 6:
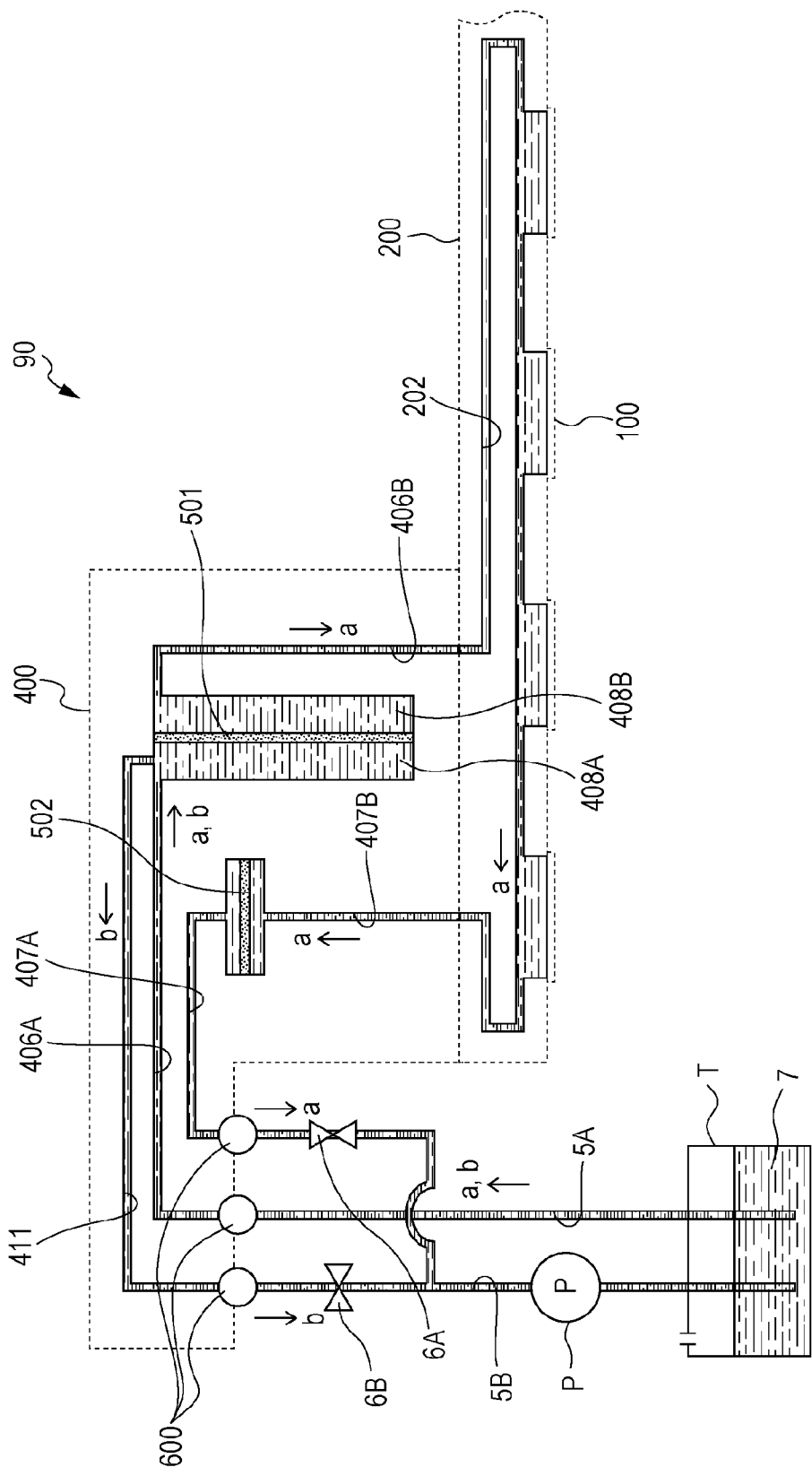
FIG. 6 is a schematic illustration of the configuration of the inkjet recording head illustrated in FIG. 1.

As illustrated in FIG. 1, the inkjet recording head 90 has the ink supply units 400 on both sides in the length direction thereof so that the two ink supply units 400 face in opposite directions. FIG. 6 is a schematic illustration of the structure of the inkjet recording head 90.

A recording apparatus includes an ink tank T that reserves ink 7 to be supplied to the inkjet recording head 90. The recording apparatus further includes ink flow passages 5A and 5B that allow the ink tank T to communicate with the ink supply unit 400. In addition, a pump P is provided in at least one of the ink flow passages 5A and 5B. The pump P functions as a circulation unit for circulating the ink 7 in the ink tank T between the ink tank T and the inkjet recording head 90. According to the present exemplary embodiment, the pump P is provided in the ink flow passage 5B.

The ink flow passage 5B includes a first bulb 6A and a second bulb 6B. During a recording operation performed by the recording apparatus, the first bulb 6A is made open, and the second bulb 6B is closed. Thus, in the inkjet recording head 90, the ink 7 circulates along a path indicated by an arrow "a" in FIG. 6. More specifically, the ink 7 flows from the ink tank T. The ink 7 flows through the ink flow passage 5A. Thereafter, the ink 7 passes through the first filter 501 disposed in the ink supply unit 400. Subsequently, the ink 7 flows through an ink flow passage 202 formed in the fixing member 200 and returns to the ink tank T via the second filter 502.

In this way, during a recording operation performed by the recording apparatus, the ink supply unit 400 can stably supply the ink 7 from the ink flow passage 202 to the recording element substrates 100. In addition, the ink supply unit 400 can circulate the ink 7 to cool the recording element substrates 100. It is desirable that the first filter 501 disposed in a path of the ink 7 supplied to the recording element substrates 100 have a large area to prevent the flow resistance of the ink 7 in the path from being increased.

If the flow resistance of the ink 7 is increased by the first filter 501, ink supply to the recording element substrates 100 may fail. According to the present exemplary embodiment, in the ink flow passage 202, the flow rate of ink required for sufficiently cooling the recording element substrates 100 is about 50 to about 200 cc/min. Accordingly, the diameter of a hole of the first filter 501 is set to about 5 μm, and the area of the first filter 501 is set to about 1000 mm² to about 4000 mm².

In contrast, since the flow resistance of the second filter 502 provided on the side on which the ink is output from the recording element substrates 100 has no influence on ejection of the ink 7 performed by the recording element substrates 100, the area of the second filter 502 can be reduced.

Part of the ink 7 that has passed through the first filter 501 is delivered to the recording element substrates 100 and is used for the recording operation. Accordingly, the amount of ink that passes through the second filter 502 is less than the amount of ink that passes through the first filter 501. This also indicates that the area of the second filter 502 can be less than the area of the first filter 501.

In addition, in order to remove a bubble from the inkjet recording head 90, it is desirable that the area of the second filter 502 be small. However, as the area of the second filter 502 increases, the ink filtering performance of the second filter 502 increases. According to the present exemplary embodiment, in order to balance these two features, the diameter of a hole of the second filter 502 is set to about 5 μm, and the area of the second filter 502 is set to about 50 mm² to about 200 mm².

The first filter container 408 is separated into a filter container 408A and a filter container 408B by the first filter 501.

In order to remove the air (a bubble) staying in the filter container 408A when the inkjet recording head 90 is filled with ink before a recording operation is started or when a recording operation is not performed, the first bulb 6A is closed, and the second bulb 6B is made open. In this way, in the inkjet recording head 90, the ink 7 circulates along a path indicated by an arrow b in FIG. 6.

In order to moisturize the nozzles of the recording element substrates 100 during a non-recording operation period of the recording apparatus, the inkjet recording head 90 is filled with the ink 7 for circulation. When the inkjet recording head 90 is mounted in the recording apparatus, the ink 7 for circulation in the inkjet recording head 90 is ejected until the inkjet recording head 90 is emptied. After the inkjet recording head 90 is emptied in this manner, the inkjet recording head 90 is filled with the ink 7 for recording.

If the ink 7 is circulated along the path indicated by the arrow a in order to fill the inkjet recording head 90 with the ink 7, the ink 7 flows from the bottom of the first filter 501 and enters the filter container 408B. Accordingly, the filter container 408A is not filled with the ink 7. Thus, the ink 7 needs to be circulated along the path indicated by the arrow b first until the filter container 408A is filled with the ink 7.

In addition, during a recording operation performed by the recording apparatus, a bubble entrapped in, for example, the ink flow passage 406A may stay in the filter container 408A. If a bubble stays in the filter container 408A, the area of the first filter 501 through which the ink 7 passes is decreased. Thus, the flow resistance occurring when the ink 7 passes through the first filter 501 increases. In order to prevent the increase in flow resistance, the ink 7 is passed along the path indicated by the arrow b before the recording operation is started. In this way, a bubble is removed from the filter container 408A.

Recording Apparatus

The recording apparatus having the inkjet recording head according to the present exemplary embodiment mounted therein is described next.

Figure 7:
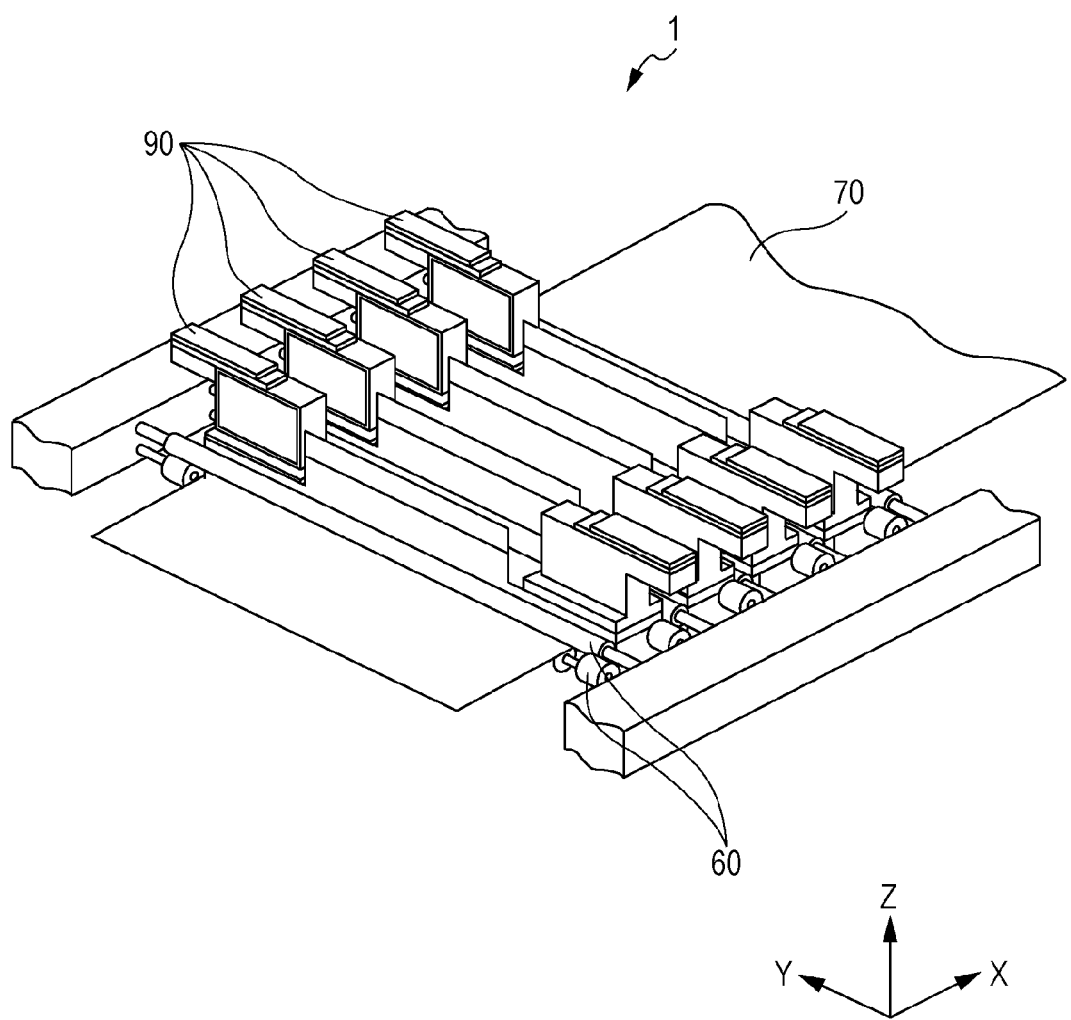
FIG. 7 is a perspective view of a recording apparatus to which the inkjet recording head is applicable.
Figure 8:
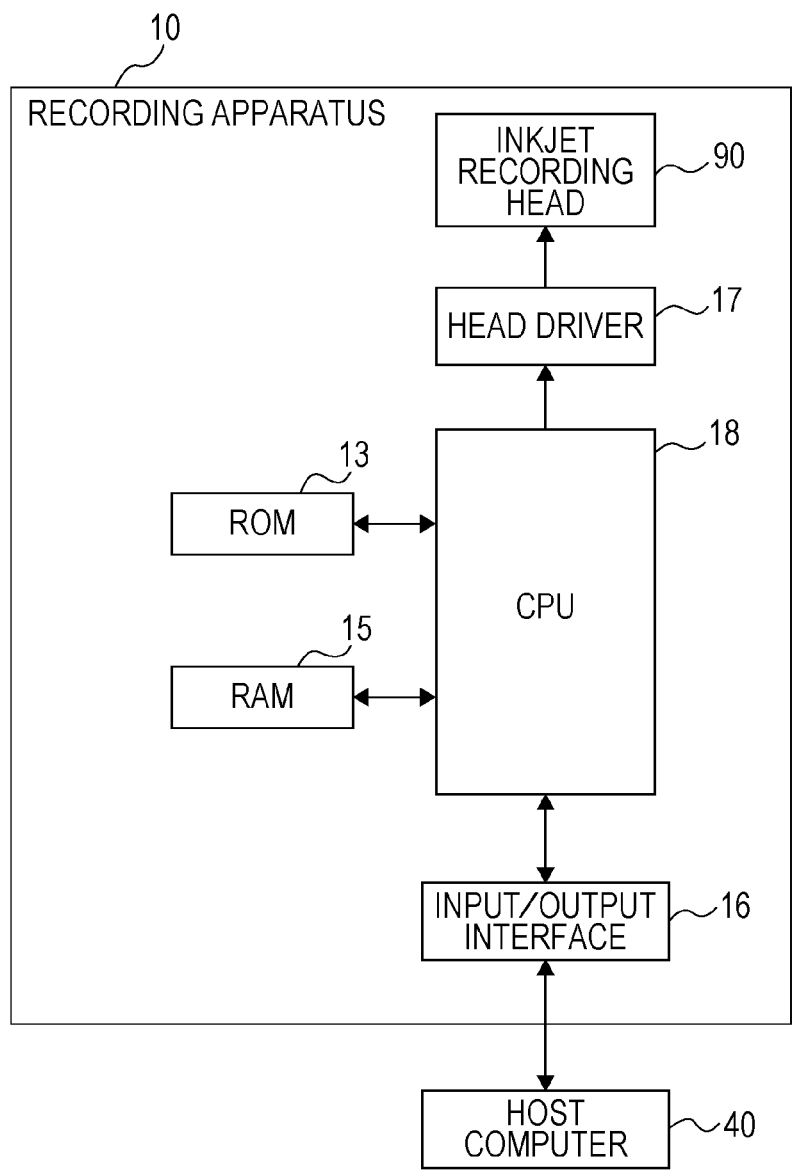
FIG. 8 is a functional block diagram of the recording apparatus illustrated in FIG. 7.

FIG. 7 is a partial schematic illustration of the recording apparatus 10 in which the inkjet recording head 90 is mountable. FIG. 8 is a functional block diagram of a control unit of the recording apparatus 10 according to the present exemplary embodiment. In FIG. 7, the recording apparatus 10 performs a recording operation. For example, the recording apparatus 10 includes four of the inkjet recording heads 90 corresponding to Bk, C, M, and Y ink. A sheet conveying roller 60 is disposed between every two of the inkjet recording heads 90. Thus, a recording medium 70 is conveyed by the sheet conveying rollers 60.

A central processing unit (CPU) 18 that is included in the recording apparatus 10 and that serves as the control unit drives the electrothermal transducers 103 of the inkjet recording heads 90 so that the ink 7 is ejected from the nozzles 106 (refer to FIG. 3). In this way, the ink 7 is deposited onto the recording medium 70 and, thus, recording is performed on the recording medium 70 on the basis of a recording signal.

Since the inkjet recording heads 90 are arranged in a direction in which a sheet is conveyed in the above-described manner, it is desirable that the total length of the inkjet recording heads 90 in the arrangement direction (the X direction in FIG. 7) be small. In order to reduce the total length, the pitch of the arrangement of the inkjet recording heads 90 can be reduced, for example. Thus, the size of the recording apparatus 10 can be reduced. In addition, since the size of a region in which the recording medium needs to be parallel to the inkjet recording heads 90 is reduced, the accuracy of conveying a recording medium can be increased. Consequently, the occurrence of paper jamming can be reduced. In this way, the recording apparatus 10 can perform high-quality recording on the recording medium.

An exemplary configuration of the recording apparatus 10 is described in detail below with reference to FIG. 8.

The recording apparatus 10 receives recording information input by a user from a host computer 40. The recording information received by the recording apparatus 10 is temporarily stored in an input/output interface 16 provided in the recording apparatus 10. In addition, the recording information is converted into data that is processable by the recording apparatus 10. Thereafter, the data is input to the CPU 18 that also serves as a unit for supplying an inkjet recording head drive signal.

The CPU 18 processes the data input to the CPU 18 in accordance with a control program stored in a read only memory (ROM) 13 using a peripheral unit (e.g., a random access memory (RAM) 15). In addition, through such a process, the CPU 18 converts the data into binary data (data to be recorded) that indicates whether an ink dot is formed on the recording medium.

The recording data and the inkjet recording head drive data output from the CPU 18 are input to a head driver 17. The head driver 17 drives the electrothermal transducers 103 mounted in the inkjet recording heads 90 in accordance with the binary data and the inkjet recording head drive data so that the inkjet recording heads 90 eject ink.

Ink Supply Unit

Figure 9:
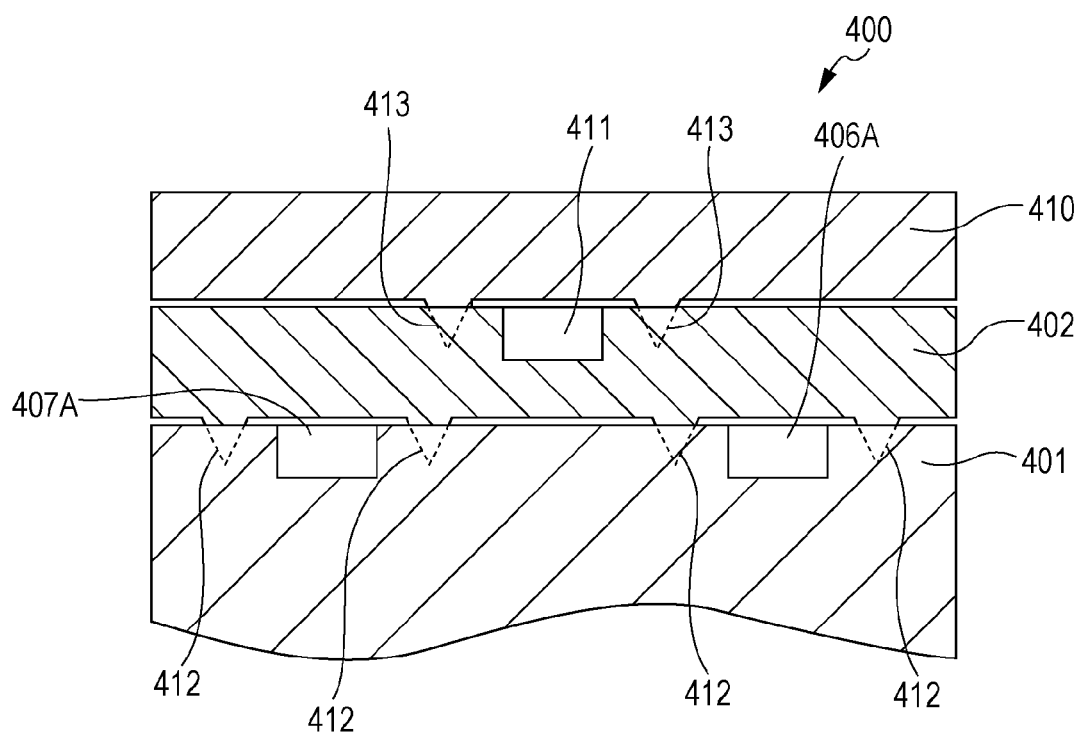
FIG. 9 is a partial cross-sectional view of the inkjet recording head illustrated in FIG. 1.
Figure 10A:
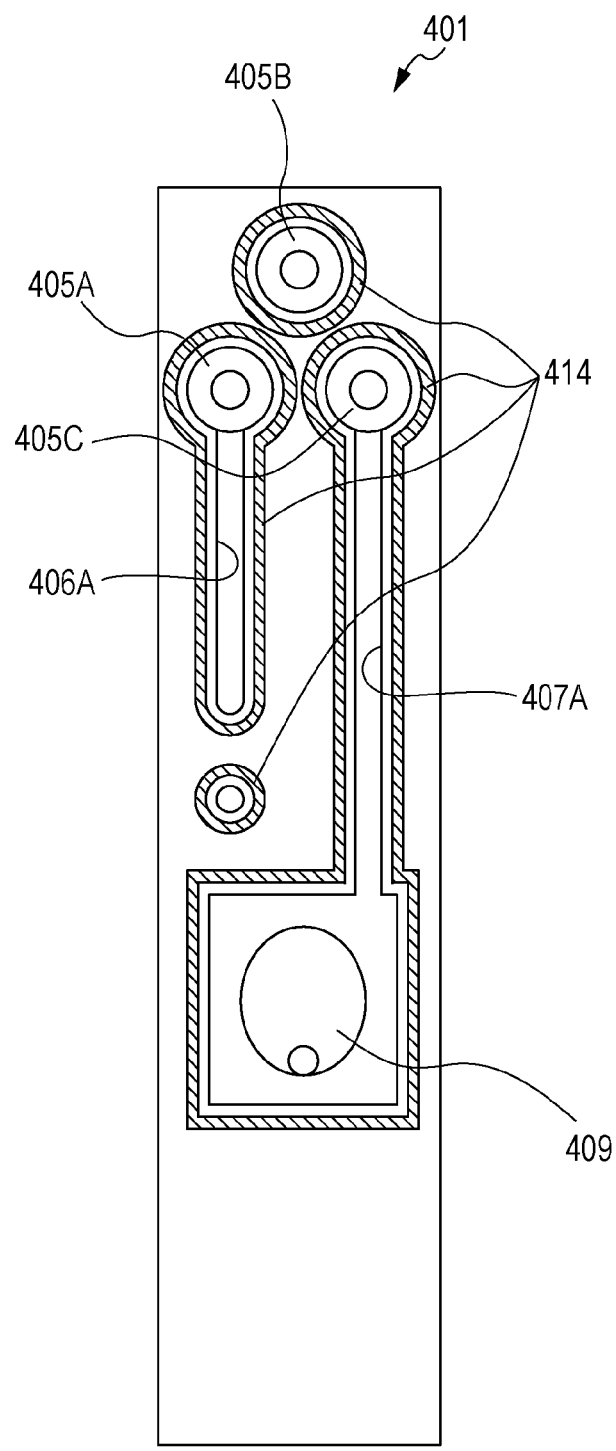
FIGS. 10A and 10B illustrate the weld portions of the inkjet recording head illustrated in FIG. 1.
Figure 10B:
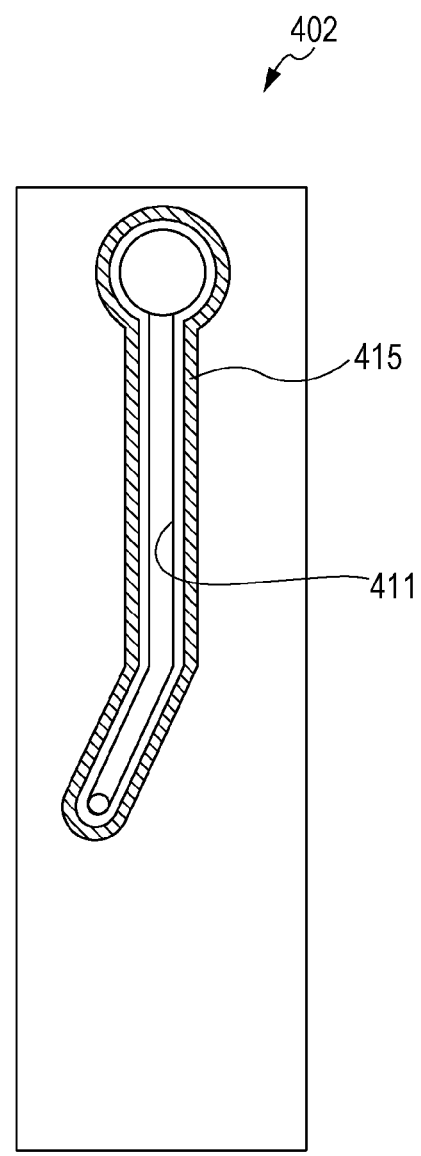

The ink supply unit 400 used in each of the inkjet recording heads 90 is described in detail below with reference to FIG. 9 and FIGS. 10A and 10B. FIG. 9 is a cross-sectional view of the ink supply unit 400 taken along a line IX-IX of FIG. 1. FIGS. 10A and 10B are schematic illustration of the areas of weld portions 414 and 415, respectively.

As noted above, the ink supply unit 400 has a stable ink supply performance, an excellent performance of cooling the recording element substrates 100, and an excellent performance of removing a bubble from the flow passages. In order to reduce the size of each of the inkjet recording heads 90, the first filter 501 having a large area is disposed on the side surface of the filter containing member 401 (refer to FIGS. 4 and 5). Such a structure can minimize the size of the inkjet recording head 90.

In addition, in order to reduce the size of the inkjet recording head 90 in the width direction (the direction indicated by the arrow X in FIG. 7), each of the ink flow passages 406A, 406B, and 411 is formed so as to have two layers. Accordingly, the filter containing member 401, the first plate 402, and the second plate 410 that form the ink flow passages 406A, 406B, and 411 are stacked.

As illustrated in FIG. 9, a plurality of welding ribs 412 are formed on the bottom surface of the first plate 402. In addition, a plurality of welding webs 413 are formed on the bottom surface of the second plate 410. The welding ribs 412 of the first plate 402 are ultrasonically welded to the top surface of the filter containing member 401 having the ink flow passages 406A and 407A formed therein. The welding ribs 413 of the second plate 410 are ultrasonically welded to the top surface of the first plate 402 having the ink flow passage 411 formed therein. In this way, each of the filter containing member 401, the first plate 402, and the second plate 410 functions as the flow passage forming member. Thus, if the filter containing member 401, the first plate 402, and the second plate 410 are stacked and are welded to each other, the filter containing member 401, the first plate 402, and the second plate 410 are integrated into one body that functions as a flow passage assembly.

A variation in the flatness of the top ends of the welding ribs 412 and 413 or a variation in the flatness of the surface to be welded produces portions having different collapsed amounts (melt-down amounts) caused by application of ultrasonic energy. Thus, the weld width of a joint of the welding ribs having a small collapsed amount is relatively small and, therefore, the weld strength of the joint is relatively small. In the present exemplary embodiment, the ultrasonic weld joint between the first plate 402 and the third plate 403 of the ink supply unit 400 has a long length in the range of about 100 to about 200 mm in the length direction, and the area of the weld joint is relatively large. Consequently, the collapsed amounts of the welding ribs differ from one another due to, for example, warping of the plates. As a result, joints having high weld strengths and low weld strengths easily appear.

According to the present exemplary embodiment, after the first plate 402 is ultrasonically welded to the filter containing member 401, the second plate 410 is ultrasonically welded to the first plate 402. Accordingly, when the second plate 410 is ultrasonically welded to the first plate 402, a joint having a low weld strength among the ultrasonically welded joints of the filter containing member 401 and the first plate 402 may partially come apart due to a shock caused by ultrasonic vibration.

In contrast, according to the present exemplary embodiment, the following structure allows a reliable flow passage assembly to be manufactured.

The filter containing member 401 includes the ink flow passage 406A and the ink flow passage 407A that are covered by the first plate 402 if the first plate 402 is welded to the filter containing member 401. The first plate 402 includes the ink flow passage 411 that are covered by the second plate 410 if the second plate 410 is welded to the first plate 402.

In FIGS. 10A and 10B, the weld portions 414 of the filter containing member 401 to which the welding ribs 412 of the first plate 402 are to be welded are indicated by slanted lines. In addition, the weld portion 415 of the first plate 402 to which the welding rib 413 of the third plate 403 are to be welded is indicated by slanted lines.

As illustrated in FIG. 9, the cross-sectional shape of each of the welding ribs 412 of the first plate 402 is the same as that of each of the welding ribs 413 of the second plate 410. Note that in FIG. 9, collapsed portions (melt-down portions) of the welding ribs 412 and 413 due to the ultrasonic welding are indicated by dotted lines. The collapsed amounts of the welding ribs 412 and 413 due to the ultrasonic welding are substantially the same. Accordingly, the widths of the weld portion 414 and the weld portion 415 are substantially the same.

However, although the filter containing member 401 has two ink flow passages (i.e., the ink flow passages 406A and 407A), the first plate 402 has one ink flow passage (i.e., the ink flow passage 411). Accordingly, the area of portions of the filter containing member 401 and the first plate 402 to be welded increases. That is, the total area of the weld portions 414 to be welded is larger than, or greater than, that of the weld portion 415.

Consequently, the energy (the amplitude and the load) required when the welding ribs 413 of the second plate 410 is ultrasonically welded to the first plate 402 is smaller than, or less than, that required when the welding ribs 412 of the first plate 402 is ultrasonically welded to the filter containing member 401. Accordingly, when the welding ribs 413 of the second plate 410 are welded to the first plate 402 after the welding ribs 412 of the first plate 402 has been welded to the filter containing member 401, ultrasonic shock applied to the weld portion 414 can be reduced.

Figure 11:
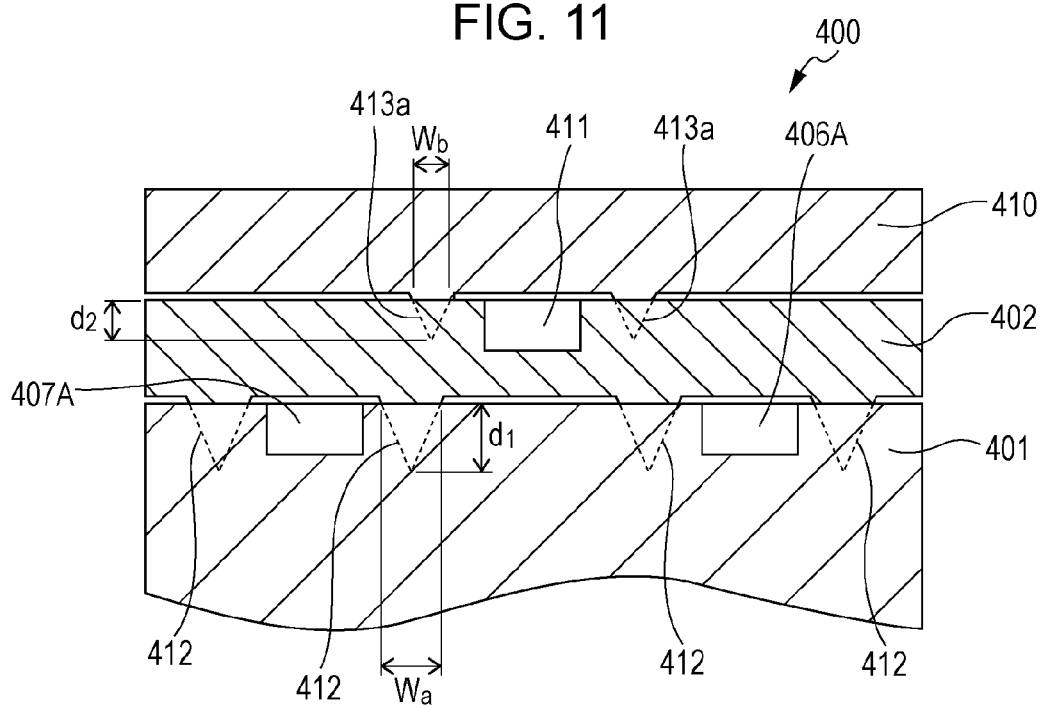
FIG. 11 illustrates an example of a modification of the structure illustrated in FIG. 9.
Figure 12:
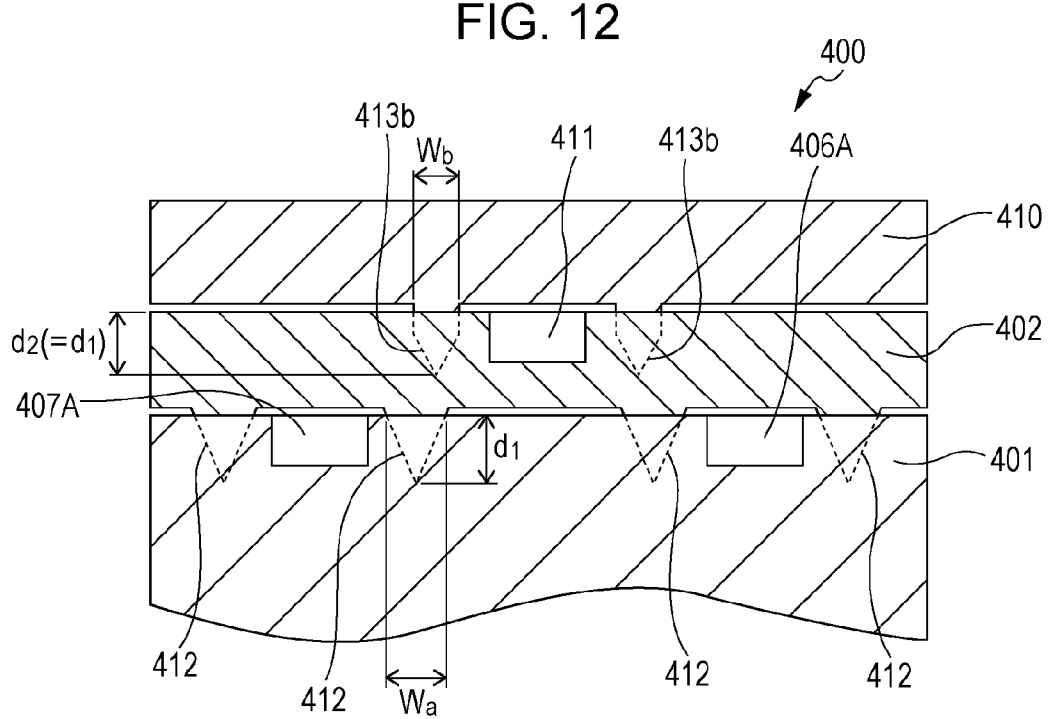
FIG. 12 illustrates an example of a modification of the structure illustrated in FIG. 9.

Note that by changing the welding conditions of the ultrasonic welding process, the collapsed amount of the welding rib can be changed. In addition, the shape of the welding rib in cross section is not limited to the shape illustrated in FIG. 9. Modifications of the welding rib are illustrated in FIGS. 11 and 12. Each of FIGS. 11 and 12 corresponds to FIG. 9. The structure other than that of the welding rib of the second plate 410 is similar to the structure illustrated in FIG. 9.

As illustrated in FIG. 11, a welding rib 413a of the second plate 410 is smaller than each of the welding ribs 412 of the first plate 402. The welding rib 412 and 413a have triangular shapes in cross section that are homologous. Let $W_a$ denote the width of the cross section of the welding rib 412, and let $d_1$ denote the height of the cross section of the welding rib 412. In addition, let $W_b$ denote the width of the cross section of the welding rib 413a, and let $d_2$ denote the height of the cross section of the welding rib 413a. Then, $W_a > W_b$, and $d_1 > d_2$.

As illustrated in FIG. 11, by reducing the size of the welding rib 413a of the second plate 410 to less than the size of the welding ribs 412 of the first plate 402, the width of the weld portion 414 illustrated in FIG. 10A can be greater than the width of the weld portion 415. Thus, the difference between the total weld area of the weld portions 414 of the filter containing member 401 and the total weld area of the weld portion 415 of the first plate 402 is further increased. In such a case, the ultrasonic energy used for ultrasonically welding the welding ribs 413a of the second plate 410 to the first plate 402 can be reduced. Consequently, when the welding ribs 413a of the second plate 410 are welded to the first plate 402 after the welding ribs 412 of the first plate 402 have been welded to the filter containing member 401, ultrasonic shock applied to the weld portions 414 can be reduced.

As illustrated in FIG. 12, a welding rib 413b of the second plate 410 is smaller than each of the welding ribs 412 of the first plate 402. The welding rib 413b is perpendicular to the bottom surface of the second plate 410, and the top end of the welding rib 413b has a triangular shape in cross section. Let $W_b$ denote the width of the cross section of the welding rib 413b, and let $d_2$ denote the height of the welding rib 413b. Then, $W_a > W_b$, and $d_1 = d_2$.

As illustrated in FIG. 12, by reducing the size of the welding rib 413b of the second plate 410 to less than the size of the welding rib 412 of the first plate 402, the width of the weld portion 414 illustrated in FIG. 10A can be made greater than the width of the weld portion 415. Thus, the difference between the total weld area of the weld portions 414 of the filter containing member 401 and the total weld area of the weld portion 415 of the first plate 402 is further increased. In such a case, the ultrasonic energy used for ultrasonically welding the welding ribs 413b of the second plate 410 to the first plate 402 can be reduced. Consequently, when the welding ribs 413b of the second plate 410 is welded to the first plate 402 after the welding ribs 412 of the first plate 402 have been welded to the filter containing member 401, ultrasonic shock applied to the weld portions 414 can be reduced.

While the present exemplary embodiment has been described with reference to the flow passage assembly having three ink flow passages formed therein, the number of the ink flow passages is not limited thereto. For example, a number of the flow passages equal to the number of ink colors can be formed in the flow passage assembly. In addition, while the present exemplary embodiment has been described with reference to a process in which three flow passage forming members (i.e., the filter containing member 401, the first plate 402, and the second plate 410) are stacked so as to form the ink flow passage, the process is not limited thereto. For example, four or more flow passage forming members may be stacked in order to form a flow passage.

While the present exemplary embodiment has been described with reference to a process in which the second plate 410 is ultrasonically welded to the first plate 402 after the first plate 402 has been ultrasonically welded to the filter containing member 401, the first plate 402 may be ultrasonically welded to the filter containing member 401 after the second plate 410 has been ultrasonically welded to the first plate 402. Note that in such a case, the total area of the weld portions between the first plate 402 and the second plate 410 needs to be larger than, or greater than the total area of the weld portions between the filter containing member 401 and the first plate 402.

That is, if the ultrasonic welding is performed in such a sequence that the total area of weld portions which are welded first is larger than that subsequently welded, the weld joint subjected to ultrasonic welding first does not come apart due to the subsequent ultrasonic welding.

However, in terms of stable supply of ink, it is desirable that as illustrated in FIG. 9, a large number of the ink flow passages be disposed between the filter containing member 401, which serves as a lower layer, and the first plate 402, that is, it is desirable that a large number of the ink flow passages be disposed so as to be close to the recording element substrate of the recording head. Since an ink flow passage disposed in an upper layer has many weld joints of the flow passage forming member, a bubble may easily stay at a stepped portion generated by displacement of parts. Thus, the ink supply performance may be decreased. According to the present exemplary embodiment, the ink flow passages 406A and 407A are disposed in a lower layer and, thus, the risk of low ink supply performance can be decreased. In addition, as described above, the ink flow passage 411 disposed in an upper layer is used only when a bubble staying in the filter container 408A is removed. Accordingly, even when a bubble stays in the stepped portion generated by displacement of parts, the bubble has no negative impact on a normal printing operation.

In addition, by employing a structure in which the total weld area in the lower layer is large, the sizes of components that form an ink flow passage disposed in an upper layer can be reduced. As illustrated in FIG. 4, the ink flow passage 407A having a large size in the length direction is disposed in the lower layer, and the ink flow passage 411 having a size that is smaller than the size of the ink flow passage 407A in the length direction is disposed in the upper layer. In this way, the size of the second plate 410 can be made smaller than that of the first plate 402 in the length direction. As described above, if the size of a component is reduced, the cost can be advantageously reduced. In addition, since ultrasonic welding is effected by the flatness of the component, it is desirable that the size of the component be minimized in order to increase the flatness of the component.

While the present exemplary embodiment has been described with reference to a full line inkjet recording head, application of the method for manufacturing a layered product using ultrasonic welding is not limited thereto. For example, the method according to the present exemplary embodiment is widely applicable to a layered product manufactured from a plurality of stacked members that form a plurality of flow passages. In layered products manufactured using the method according to the present exemplary embodiment, leaking negligibly occurs. Thus, a reliable flow passage can be formed.

Second Exemplary Embodiment

Figure 13A:
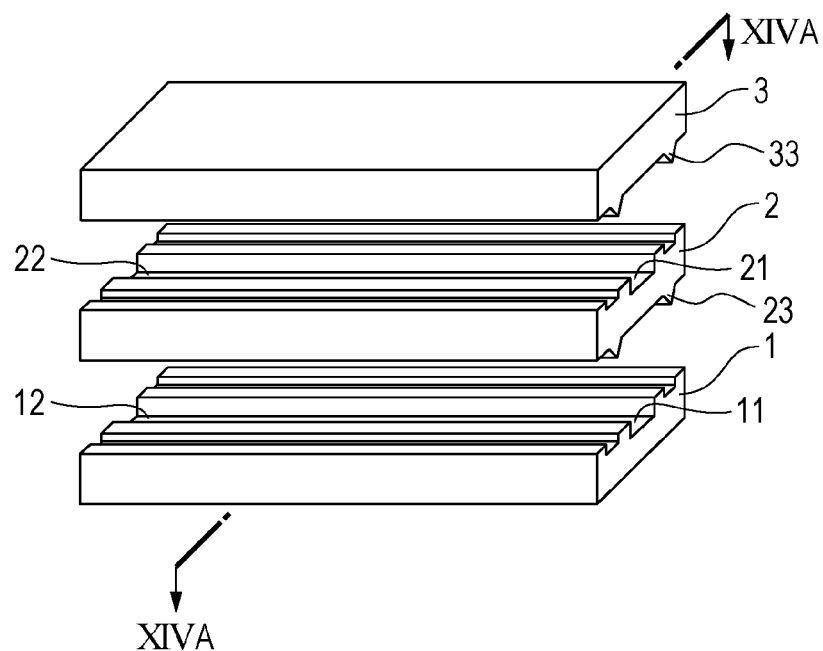
FIGS. 13A and 13B are perspective views of a flow passage assembly according to a second exemplary embodiment of the present invention.
Figure 13B:
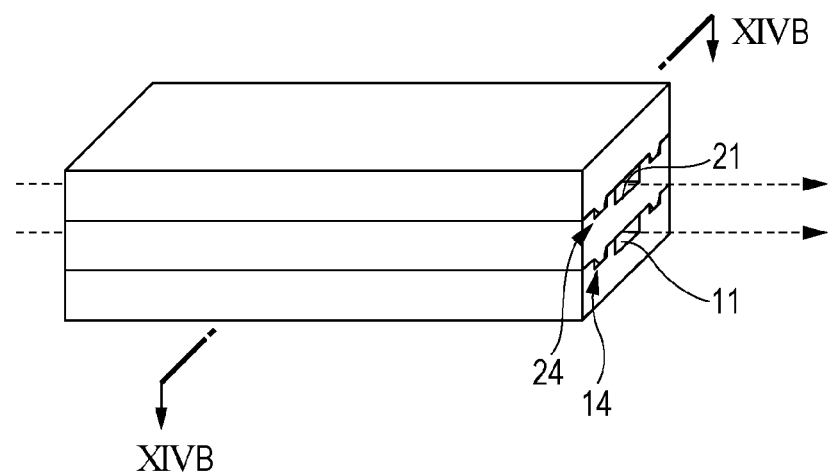
Figure 14A:
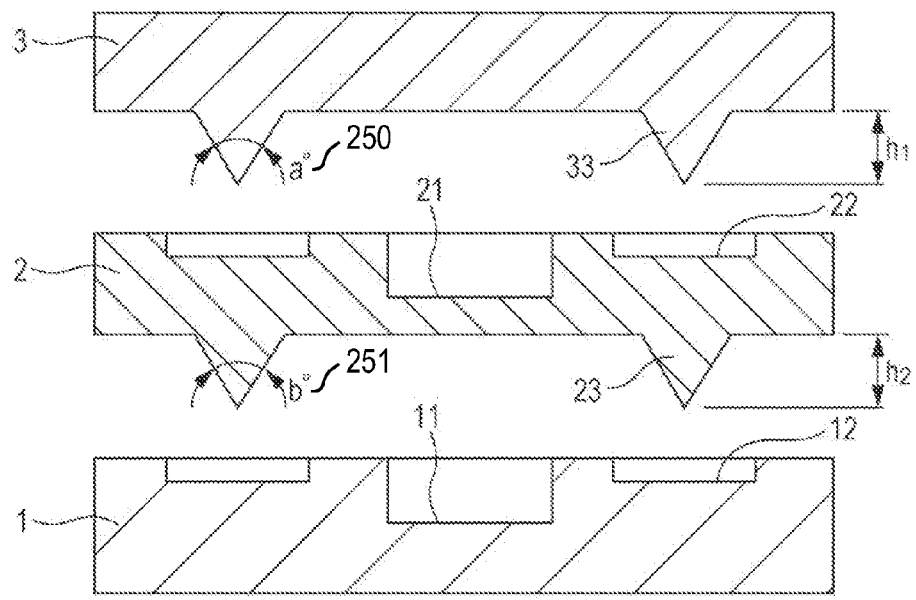
FIGS. 14A and 14B are cross-sectional views of the flow passage assembly illustrated in FIGS. 13A and 13B.
Figure 14B:
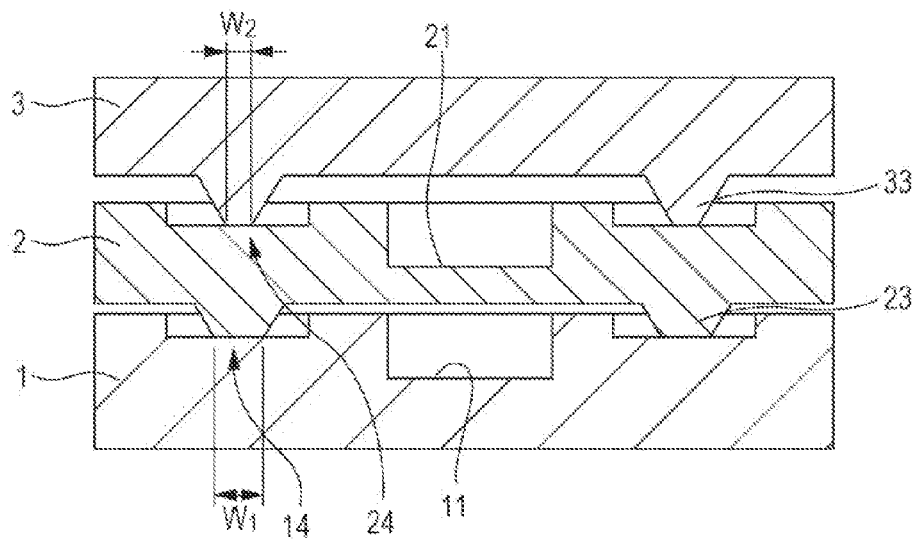
Figure 15A:
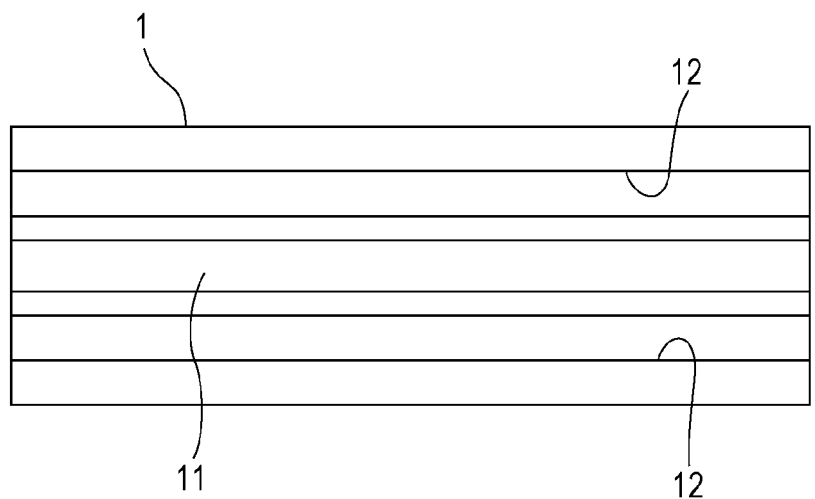
FIGS. 15A and 15B are plan views of the flow passage assembly illustrated in FIGS. 13A and 13B.
Figure 15B:
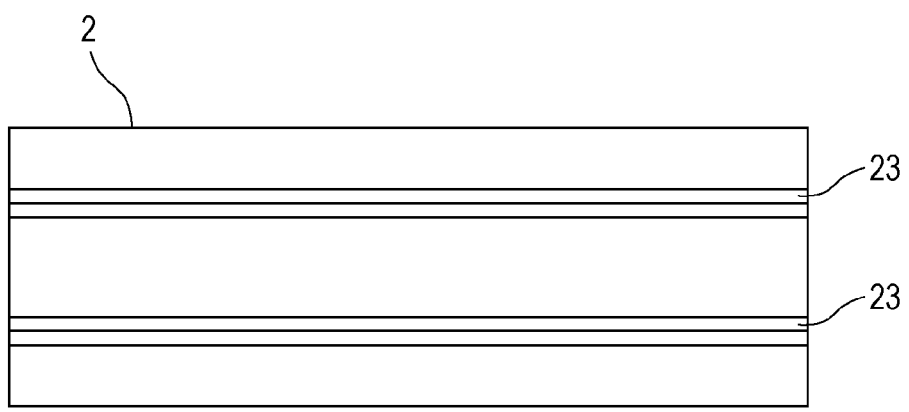

FIGS. 13A and 13B are schematic illustrations of the structure of a flow passage assembly according to a second exemplary embodiment of the present invention. FIG. 13A is an exploded perspective view of the flow passage assembly, and FIG. 13B is a perspective view of the flow passage assembly. FIGS. 14A and 14B are cross-sectional views of the flow passage assembly according to the present exemplary embodiment. FIG. 14A is a cross-sectional view taken along a line XIVA-XIVA of FIG. 13A. FIG. 14B is a cross-sectional view taken along a line XIVB-XIVB of FIG. 13B. FIG. 15A is a top view of a flow passage forming member 1. FIG. 15B is a bottom view of a flow passage forming member 2.

The flow passage assembly includes three flat plate members, that is, the first flow passage forming member 1, the second flow passage forming member 2, and a third flow passage forming member 3.

The top surface of the flow passage forming member 1 has a flow passage groove 11 and two grooves 12 formed therein. The flow passage groove 11 and the grooves 12 extend in the length direction of the flow passage forming member 1. The flow passage groove 11 is located in the middle of the top surface of the flow passage forming member 1. The grooves 12 are located on either side of the flow passage groove 11.

The bottom surface of the flow passage forming member 2 has welding ribs 23 formed therein at locations corresponding to the grooves 12 of the flow passage forming member 1. The welding ribs 23 protrude downwardly.

The top surface of the flow passage forming member 2 has a flow passage groove 21 and two grooves 22 formed therein. The flow passage grooves 21 and the grooves 22 extend in the length direction of the flow passage forming member 2. The flow passage groove 21 is located in the middle of the top surface of the flow passage forming member 2. The grooves 22 are located on either side of the flow passage groove 21.

The bottom surface of the flow passage forming member 3 has welding ribs 33 formed therein at locations corresponding to the grooves 22 of the flow passage forming member 2. The welding ribs 33 protrude downwardly.

The welding ribs 23 and 33 have the same cross section that is perpendicular to the length direction throughout their lengths. As illustrated in FIGS. 14A and 14B, each of the welding ribs 23 and 33 has a cross section forming an isosceles triangle. The apex of the isosceles triangle is oriented downward. At that time, according to the present exemplary embodiment, the apex angle b° 251 of the welding rib 23 is the same as the apex angle a° 251 of the welding rib 33. That is, a° 250=b° 251. In addition, the height $h_2$ of the welding rib 23 from the bottom surface of the flow passage forming member 2 is the same as the height $h_1$ of the welding rib 33 from the bottom surface of the flow passage forming member 3. That is, $h_1=h_2$. That is, according to the present exemplary embodiment, the welding rib 23 and the welding rib 33 have the same shape.

The welding ribs 23 and 33 are made of a material, such as a polymer, that is meltable by ultrasonic vibration. Accordingly, by welding the welding ribs 23 into the grooves 12 using an ultrasonic welding process, a weld joint 14 can be formed. In addition, by welding the welding rib 33 into the groove 22, a weld joint 24 can be formed. In this way, the flow passage forming members 1, 2, and 3 are integrated into one body, and the flow passage assembly illustrated in FIGS. 13B and 14B can be formed.

In the flow passage assembly illustrated in FIGS. 13B and 14B, the flow passage groove 11 of the flow passage forming member 1 is covered by the bottom surface of the flow passage forming member 2. Thus, a first flow passage is formed. In addition, the flow passage groove 21 of the flow passage forming member 2 is covered by the bottom surface of the flow passage forming member 3. Thus, a second flow passage is formed. Accordingly, the flow passage assembly of the present exemplary embodiment has two flow passages formed by stacking the flow passage forming members 1, 2, and 3.

A method for manufacturing the flow passage assembly according to the present exemplary embodiment is described next with reference to FIGS. 16A to 16C and FIGS. 17A to 17C. FIGS. 16A to 16C and FIGS. 17A to 17C illustrate an example of the steps of the method for manufacturing the flow passage assembly according to the present exemplary embodiment.

In the method for manufacturing the flow passage assembly illustrated in FIGS. 16A to 16C, a first step illustrated in FIG. 16A (hereinafter referred to as "step A") for welding the flow passage forming member 1 to the flow passage forming member 2 is performed first. In step A, the flow passage forming member 2 is stacked on the flow passage forming member 1, and a welding horn 4 is mounted on the flow passage forming member 2. The welding horn 4 urges the flow passage forming member 2 downward. The welding horn 4 melts the welding rib 23 of the flow passage forming member 2 to weld the welding rib 23 to the groove 12 of the flow passage forming member 1 by applying ultrasonic vibration to the welding rib 23. In this way, the weld joint 14 in which the flow passage forming member 1 is welded to the flow passage forming member 2 is formed.

Subsequently, a second step illustrated in FIG. 16B (hereinafter referred to as "step B") in which the flow passage forming member 2 is welded to the flow passage forming member 3 is performed. In the step B, the flow passage forming member 3 is stacked on the flow passage forming member 2, and the welding horn 4 is mounted on the flow passage forming member 3. The welding horn 4 melts the welding rib 33 of the flow passage forming member 3 and welds the welding rib 33 to the groove 22 of the flow passage forming member 2 by applying ultrasonic vibration to the welding rib 33. In this way, the flow passage assembly according to the present exemplary embodiment is achieved (refer to FIG. 16C).

In step B, when the welding rib 33 of the flow passage forming member 3 is welded into the groove 22, a load is imposed on a weld joint between the flow passage forming member 1 and the flow passage forming member 2. According to the present exemplary embodiment, the weld joint between the flow passage forming member 1 and the flow passage forming member 2 negligibly comes apart. Such a structure is described in more detail below.

As illustrated in FIG. 14B, let $W_1$ denote the width of the weld joint 14 between the groove 12 of the flow passage forming member 1 and the welding rib 23 of the flow passage forming member 2, and let $W_2$ denote the width of the weld joint 24 between the groove 22 of the flow passage forming member 2 and the welding rib 33 of the flow passage forming member 3.

Figure 16A:
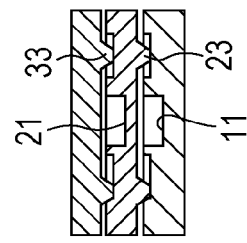
FIGS. 16A to 16C are cross-sectional views illustrating steps for manufacturing the flow passage assembly illustrated in FIGS. 13A and 13B.
Figure 16B:
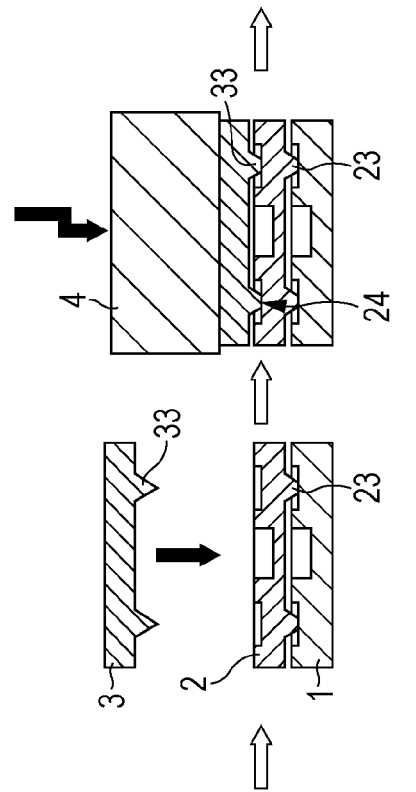
Figure 16C:
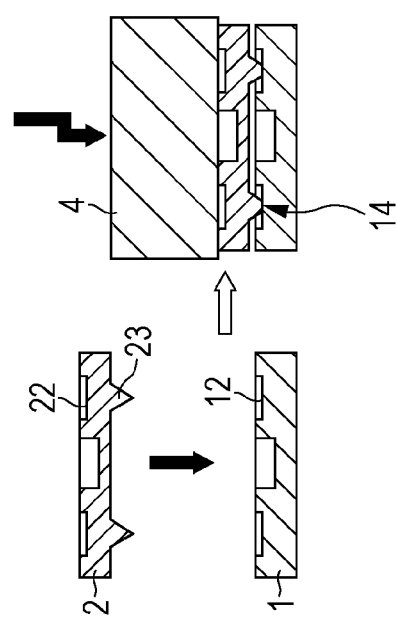

According to the method for manufacturing a flow passage assembly illustrated in FIGS. 16A to 16C, in steps A and B, the welding horn 4 is controlled so that $W_1$ is greater than $W_2$, that is, $W_1>W_2$. Accordingly, the weld area of the weld joint 14 between the flow passage forming member 1 and the flow passage forming member 2 per unit length is larger than the weld area of the weld joint 24 between the flow passage forming member 2 and the flow passage forming member 3 per unit length.

As used herein, the term "set melt-down amount" refers to the setting value for the length of a portion of a welding rib melted by the welding horn 4 and measured from the top end of the welding rib. In the ultrasonic welding process according to the present exemplary embodiment, the welding horn 4 keeps urging a flow passage forming member downward even when not applying ultrasonic vibration. Accordingly, even after applying ultrasonic vibration to the welding rib, the welding horn 4 continues to press the flow passage forming member. Thus, the actual melt-down amount of the welding rib measured from the top end of the welding rib, that is, the length of the portion of the welding rib melted by the welding horn 4 and measured from the top end of the welding rib is greater than the set melt-down amount.

The melt-down amount of the welding rib can be controlled by controlling a period of time during which the welding horn 4 generates ultrasonic vibration and the energy (J (joule)) of the ultrasonic vibration generated by the welding horn 4. As the period of time during which the welding horn 4 generates ultrasonic vibration increases, the melt-down amount of the welding rib increases. In addition, as the ultrasonic energy generated by the welding horn 4 increases, the melt-down amount of the welding rib increases.

According to the present exemplary embodiment, the set melt-down amount of the welding rib 23 is about 0.6 mm, and the actual melt-down amount of the welding rib 23 is about 0.7 mm. In addition, the set melt-down amount of the welding rib 33 is about 0.3 mm, and the actual melt-down amount of the welding rib 33 is about 0.4 mm. By controlling the welding horn 4 in this manner, $W_1$ can be made greater than $W_2$ ($W_1>W_2$).

Consequently, the weld strength of the weld joint 14 between the flow passage forming member 1 and the flow passage forming member 2 is stronger than the weld strength of the weld joint 24 between the flow passage forming member 2 and the flow passage forming member 3. Thus, when, in step B, the welding rib 33 of the flow passage forming member 3 is welded into the groove 22 of the flow passage forming member 2 and if the load is imposed on the weld joint 14 between the flow passage forming member 1 and the flow passage forming member 2, the welding rib 23 negligibly comes apart from the groove 12.

In the method for manufacturing the flow passage assembly illustrated in FIGS. 17A to 17C, a first step A for welding the flow passage forming member 2 to the flow passage forming member 3 is performed first. In step A, the flow passage forming member 3 is stacked on the flow passage forming member 2, and the welding horn 4 is mounted on the flow passage forming member 3. The welding horn 4 urges the flow passage forming member 3 downward. The welding horn 4 melts the welding rib 33 of the flow passage forming member 3 to weld the welding rib 33 into the groove 22 of the flow passage forming member 2 by applying ultrasonic vibration to the welding rib 33. In this way, the weld joint 24 in which the flow passage forming member 2 is welded to the flow passage forming member 3 is formed.

Subsequently, a second step B in which the flow passage forming member 1 is welded to the flow passage forming member 2 is performed. In the step B, the flow passage forming member 2 is stacked on the flow passage forming member 1, and the welding horn 4 is mounted on the flow passage forming member 3. The welding horn 4 melts the welding rib 23 of the flow passage forming member 2 and welds the welding rib 23 into the groove 12 of the flow passage forming member 1 by applying ultrasonic vibration to the welding rib 23. In this way, the flow passage assembly according to the present exemplary embodiment is achieved (refer to FIG. 17C).

According to the method for manufacturing a flow passage assembly illustrated in FIGS. 17A to 17C, in steps illustrated in FIGS. 17A and 17B, the welding horn 4 is controlled so that $W_2$ is greater than $W_1$, that is, $W_2 > W_1$. Accordingly, the weld area of the weld joint 24 between the flow passage forming member 2 and the flow passage forming member 3 per unit length is larger than the weld area of the weld joint 14 between the flow passage forming member 1 and the flow passage forming member 2 per unit length.

According to the present exemplary embodiment, the set melt-down amount of the welding rib 33 is about 0.6 mm, and the actual melt-down amount of the welding rib 33 is about 0.7 mm. In addition, the set melt-down amount of the welding rib 23 is about 0.3 mm, and the actual melt-down amount of the welding rib 23 is about 0.4 mm. By controlling the welding horn 4 in this manner, $W_2$ can be made greater than $W_1$ ($W_2 > W_1$).

Consequently, the weld strength of the weld joint 24 between the flow passage forming member 2 and the flow passage forming member 3 is stronger than the weld strength of the weld joint 14 between the flow passage forming member 1 and the flow passage forming member 2. Thus, when, in step B, the welding rib 23 of the flow passage forming member 2 is welded into the groove 12 of the flow passage forming member 1 and if the load is imposed on the weld joint 24 between the flow passage forming member 2 and the flow passage forming member 3, the welding rib 33 of the flow passage forming member 3 negligibly comes apart from the groove 22 of the flow passage forming member 2.

As described above, according to the methods for manufacturing the flow passage assembly illustrated in FIGS. 16A to 16C and FIGS. 17A to 17C, the welding rib of the flow passage forming member in the weld joint subjected to a welding process in a preceding step negligibly comes apart from the groove of the flow passage forming member. Consequently, according to the present exemplary embodiment, a reliable flow passage assembly can be manufactured. In addition, according to the present exemplary embodiment, the flow passage assembly includes the flow passages arranged vertically instead of horizontally. Thus, the size of the flow passage assembly can be reduced.

Figure 18:
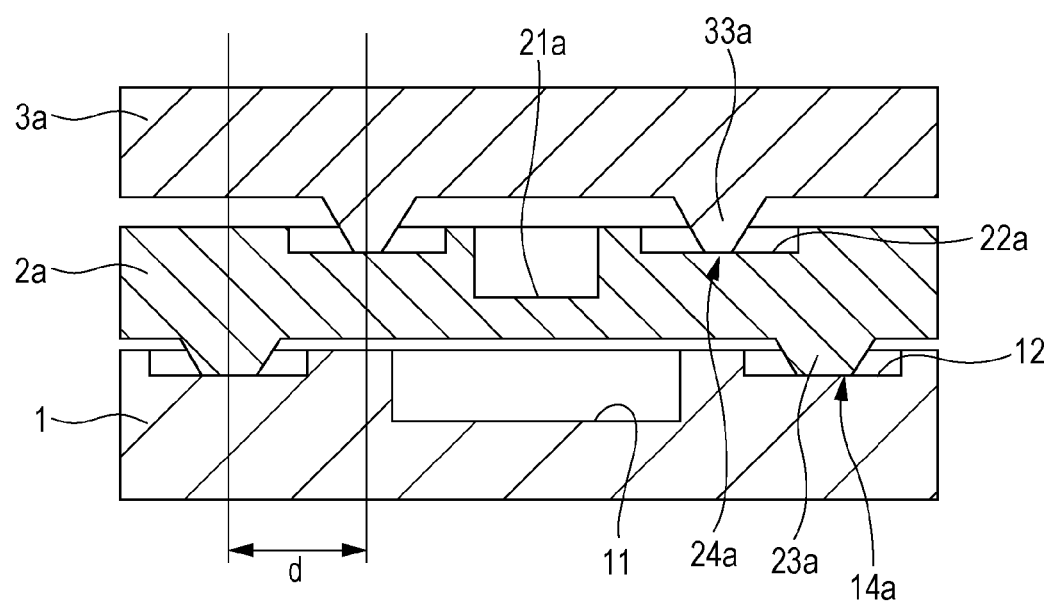
FIG. 18 is a cross-sectional view of an example of a modification of the flow passage assembly illustrated in FIGS. 13A and 13B.

Note that as illustrated in FIGS. 14A and 14B, the flow passage assembly includes the weld joint 14 between the flow passage forming member 1 and the flow passage forming member 2 located immediately beneath the weld joint 24 between the flow passage forming member 2 and the flow passage forming member 3. However, the location of the welded portion of the flow passage assembly can be appropriately changed. For example, as illustrated in FIG. 18, a weld joint 24a between a flow passage forming member 2a and a flow passage forming member 3a may be offset from a weld joint 14a between the flow passage forming member 1 and the flow passage forming member 2a toward a flow passage groove 21a by a distance d.

In addition, the shape of the flow passage groove is not limited to those illustrated in FIGS. 13 to 15. For example, like the flow passage groove 21a of the flow passage forming member 2a illustrated in FIG. 18, the flow passage assembly may include a flow passage groove having a smaller width.

Furthermore, while the present exemplary embodiment has been described with reference to the welding rib having a cross section forming an isosceles triangle, the welding rib may have any appropriate shape in cross section. For example, the welding rib may have a cross section forming any triangular shape. Still furthermore, while the present exemplary embodiment has been described with reference to a welding rib formed in the bottom surface of a flow passage forming member and a groove formed in the top surface of a flow passage forming member, any weld joint formed from a welding rib and a groove can be employed. For example, the welding rib may be formed in the top surface of a flow passage forming member, and the groove may be formed in the bottom surface of a flow passage forming member.

While the present exemplary embodiment has been described with reference to the method for manufacturing the flow passage assembly in which a welding rib is welded into a groove to form a weld joint, any appropriate method for forming a weld joint can be employed. In addition, while the present exemplary embodiment has been described with reference to the flow passage assembly including three flow passage forming members, three or more flow passage forming members may be included in the flow passage assembly. Note that in any case, a weld joint that is welded earlier needs to have a larger area of a weld joint per unit length.

Third Exemplary Embodiment

Figure 19A:
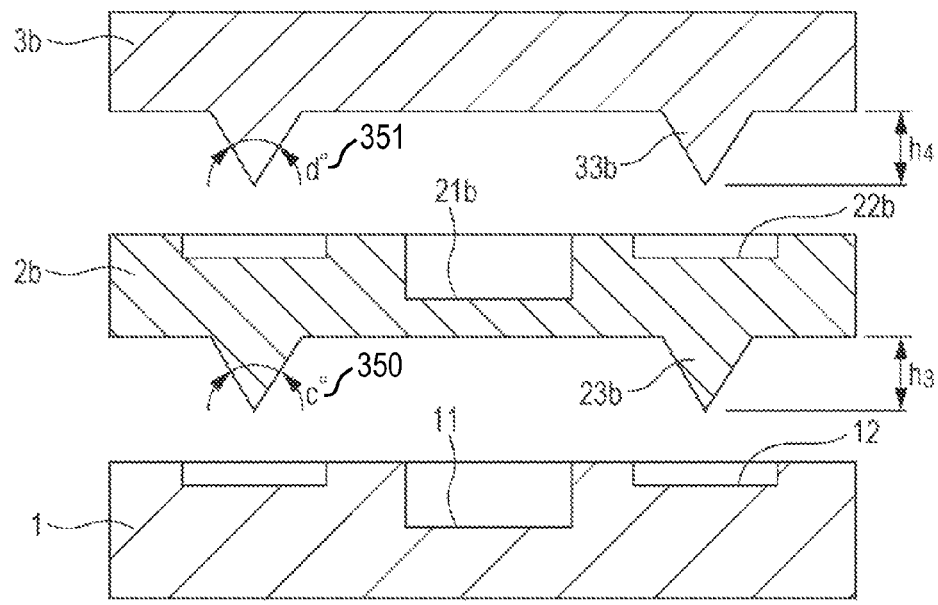
FIGS. 19A and 19B are cross-sectional views of a flow passage assembly according to a third exemplary embodiment of the present invention.
Figure 19B:
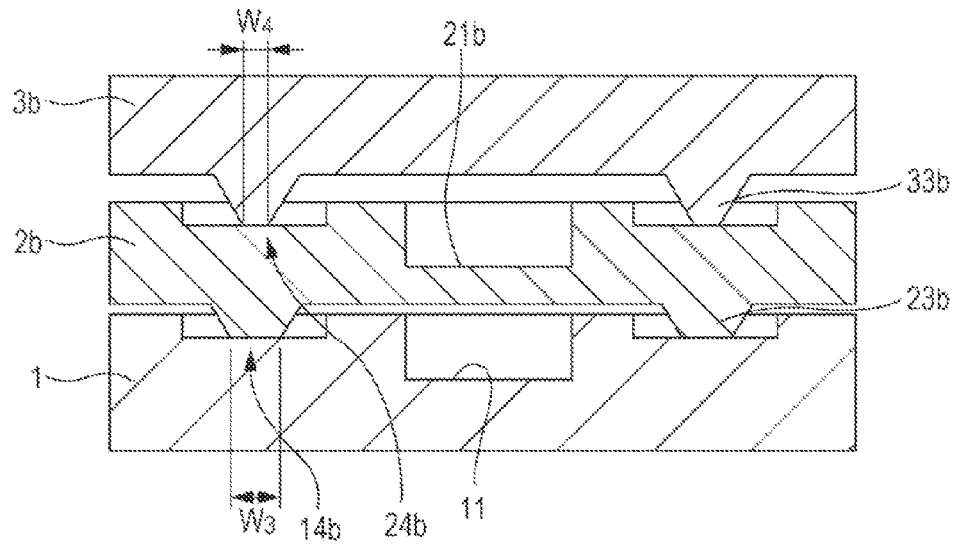

FIGS. 19A and 19B are cross-sectional views of a flow passage assembly according to a third exemplary embodiment of the present invention. FIGS. 19A and 19B correspond to FIGS. 14A and 14B that illustrate the flow passage assembly according to the second exemplary embodiment, respectively.

The flow passage assembly includes three flat plate members, that is, a first flow passage forming member 1, a second flow passage forming member 2b, and a third flow passage forming member 3b. The flow passage forming member 1 of the flow passage assembly according to the present exemplary embodiment is the same as the first flow passage forming member 1 according to the second exemplary embodiment. The second flow passage forming member 2b differs from the flow passage forming member 2 according to the second exemplary embodiment in that it has a welding rib having a different shape. The third flow passage forming member 3b differs from the flow passage forming member 3 according to the second exemplary embodiment in that it has a welding rib having a different shape.

Like the welding ribs 23 and 33 according to the second exemplary embodiment, welding ribs 23b of the flow passage forming member 2b and welding ribs 33b of the flow passage forming member 3b have cross sections that are perpendicular to the length direction and that have the same shape throughout their length. Each of the welding ribs 23b and 33b has a cross section forming an isosceles triangle shape. The apex of the isosceles triangle is oriented downward. At that time, according to the present exemplary embodiment, the apex angle c° 350 of the welding rib 23b is greater than the apex angle d° 351 of the welding rib 33b. That is, c° 350>d° 351. In addition, the height $h_3$ of the welding rib 23b from the bottom surface of the flow passage forming member 2b is the same as the height $h_4$ of the welding rib 33b from the bottom surface of the flow passage forming member 3b. That is, $h_3=h_4$.

A groove 22b of the flow passage forming member 2b is formed so as to be similar to the groove 22 of the flow passage forming member 2 according to the second exemplary embodiment. Accordingly, by welding a welding rib 23b into the groove 12 using an ultrasonic welding process, a weld joint 14b can be formed. In addition, by welding a welding rib 33b into the groove 22b, a weld joint 24b can be formed. In this way, the flow passage forming members 1, 2b, and 3b are integrated into one body, and the flow passage assembly illustrated in FIG. 19B is achieved.

According to the present exemplary embodiment, the flow passage assembly can be manufactured using a manufacturing flow that is the same as the manufacturing flow illustrated in FIGS. 16A to 16C.

As illustrated in FIG. 19B, let $W_3$ denote the width of the weld joint 14b between the groove 12 of the flow passage forming member 1 and the welding rib 23b of the flow passage forming member 2b, and let $W_4$ denote the width of the weld joint 24b between the groove 22b of the flow passage forming member 2b and the welding rib 33b of the flow passage forming member 3b.

According to the present exemplary embodiment, the setting conditions of the welding horn 4 (a period of time during which the welding horn 4 generates ultrasonic vibration and the ultrasonic energy generated by the welding horn 4) used in step A in which the first flow passage forming member 1 is welded to the second flow passage forming member 2b is the same as those used in step B in which the second flow passage forming member 2b is welded to the third flow passage forming member 3b. More specifically, each of the set melt-down amounts of the welding ribs 23b and 33b is set to about 0.4 mm. Note that each of the actual melt-down amounts of the welding ribs 23b and 33b is about 0.5 mm.

In the present exemplary embodiment, the melt-down amounts of the welding ribs 23b and 33b are the same and, as described above, c°>d°. Thus, $W_3>W_4$. Consequently, the width $W_3$ of the weld joint 14b between the flow passage forming member 1 and the flow passage forming member 2b welded in the preceding step A is greater than the width $W_4$ of the weld joint 24b between the flow passage forming member 2b and the flow passage forming member 3b welded in the subsequent step B.

Consequently, the weld strength of the weld joint 14b between the flow passage forming member 1 and the flow passage forming member 2b is stronger than the weld strength of the weld joint 24b between the flow passage forming member 2b and the flow passage forming member 3b. Thus, when, in step B, the welding rib 33b of the flow passage forming member 3b is welded into the groove 12 of the flow passage forming member 2b and if the load is imposed on the weld joint 14b between the flow passage forming member 1 and the flow passage forming member 2b, the welding rib 23b negligibly comes apart from the groove 12.

As described above, in the method for manufacturing the flow passage assembly according to the present exemplary embodiment, a welding rib of a flow passage forming member in a weld joint welded in a preceding step negligibly comes apart. As a result, by using the present manufacturing method, a reliable flow passage assembly can be achieved.

Fourth Exemplary Embodiment

Figure 20A:
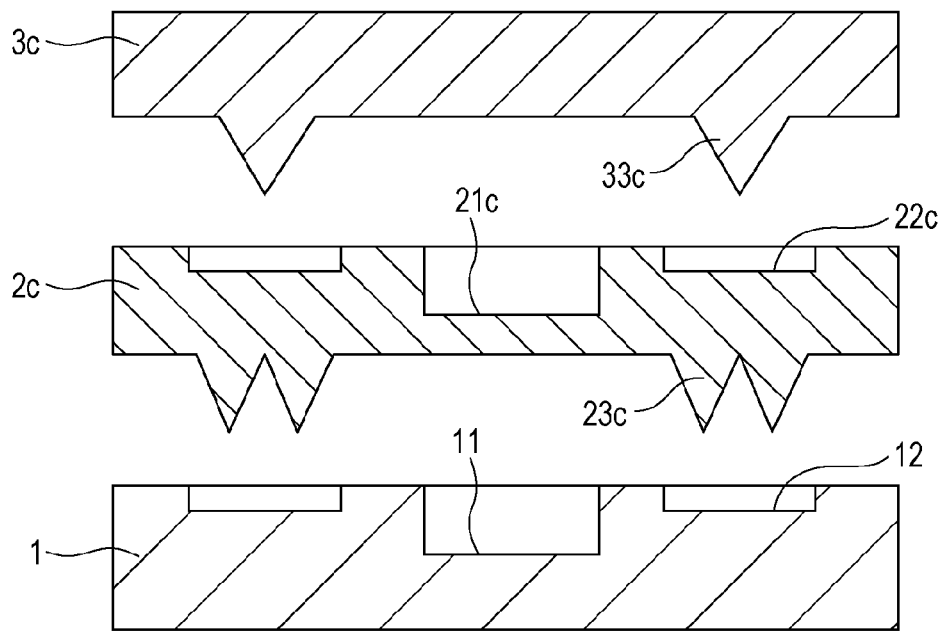
FIGS. 20A and 20B are cross-sectional views of a flow passage assembly according to a fourth exemplary embodiment of the present invention.
Figure 20B:
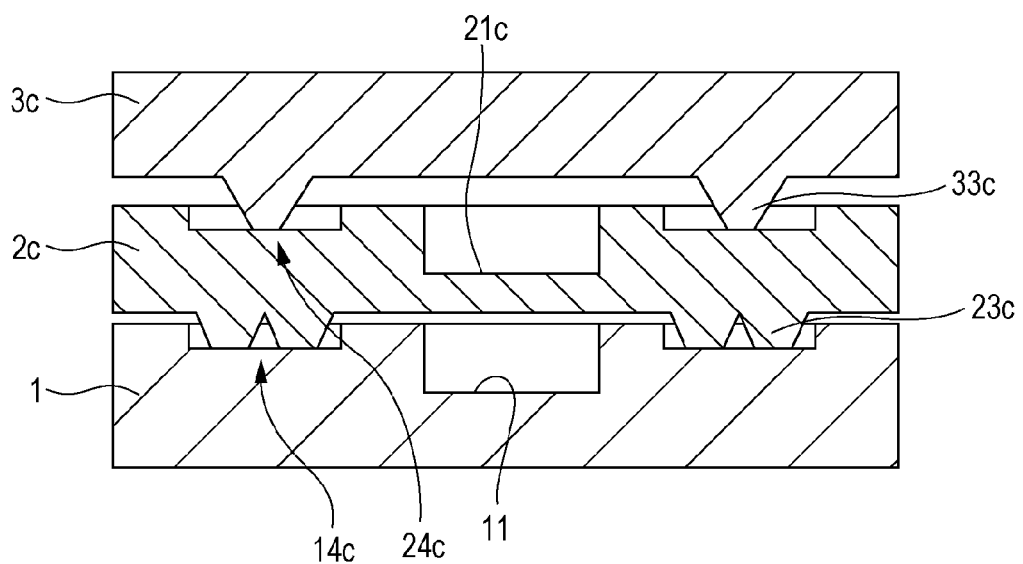

FIGS. 20A and 20B are cross-sectional views of a flow passage assembly according to a fourth exemplary embodiment of the present invention. FIGS. 20A and 20B correspond to FIGS. 14A and 14B illustrating the flow passage assembly according to the second exemplary embodiment, respectively.

The flow passage assembly includes three flat plate members, that is, a first flow passage forming member 1, a second flow passage forming member 2c, and a third flow passage forming member 3c. The first flow passage forming member 1 of the flow passage assembly according to the present exemplary embodiment is the same as the first flow passage forming member 1 according to the second exemplary embodiment. The second flow passage forming member 2c differs from the flow passage forming member 2 according to the second exemplary embodiment in that it has a welding rib having a different shape. The third flow passage forming member 3c differs from the flow passage forming member 3 according to the second exemplary embodiment in that it has a welding rib having a different shape.

Like the welding ribs 23 and 33 according to the second exemplary embodiment, a welding rib 23c of the flow passage forming member 2c and a welding ribs 33c of the flow passage forming member 3c have cross sections that are perpendicular to the length direction and that have the same shape throughout their length. Each of the welding ribs 33c has a cross section forming an isosceles triangle shape. The apex of the isosceles triangle is oriented downward. The welding rib 23c is formed from two welding ribs each having a shape in cross section that is the same as that of the welding rib 33c.

A groove 22c of the flow passage forming member 2c is formed so as to be similar to the groove 22 of the flow passage forming member 2 according to the second exemplary embodiment. Accordingly, by welding the welding rib 23c into the groove 12 using an ultrasonic welding process, a weld joint 14c can be formed. In addition, by welding the welding rib 33c into the groove 22c, a weld joint 24c can be formed. In this way, the flow passage forming members 1, 2c, and 3c are integrated into one body, and the flow passage assembly illustrated in FIG. 20B is achieved.

According to the present exemplary embodiment, the flow passage assembly can be manufactured using a manufacturing flow that is the same as the manufacturing flow illustrated in FIGS. 16A to 16C.

According to the present exemplary embodiment, the setting conditions of the welding horn 4 (a period of time during which the welding horn 4 generates ultrasonic vibration and the ultrasonic energy generated by the welding horn 4) used in step A in which the first flow passage forming member 1 is welded to the second flow passage forming member 2c is the same as those used in step B in which the second flow passage forming member 2c is welded to the third flow passage forming member 3c. More specifically, each of the set melt-down amounts of the welding ribs 23c and 33c is set to about 0.4 mm. Note that each of the actual melt-down amounts of the welding ribs 23c and 33c is about 0.5 mm.

According to the present exemplary embodiment, the melt-down amounts of the welding ribs 23c and 33c are the same. The welding rib 23c of the second flow passage forming member 2c has two welding ribs each having a shape that is the same as the shape of the welding rib 33c of the third flow passage forming member 3c. Accordingly, the total width of the weld joint 24c is double the width of the weld joint 14c.

Consequently, the weld strength of the weld joint 24c between the flow passage forming member 1 and the flow passage forming member 2c is stronger than the weld strength of the weld joint 14c between the flow passage forming member 2c and the flow passage forming member 3c. Thus, when, in step B, the welding rib 33c of the flow passage forming member 3c is welded into the groove 22c of the flow passage forming member 2c and if the load is imposed on the weld joint 24c between the flow passage forming member 1 and the flow passage forming member 2c, the welding rib 23c negligibly comes apart from the groove 12.

As described above, in the method for manufacturing the flow passage assembly according to the present exemplary embodiment, the welding rib of the flow passage forming member in a weld joint welded in a preceding step negligibly comes apart. As a result, by using the present manufacturing method, a reliable flow passage assembly can be achieved.

Fifth Exemplary Embodiment

Figure 21A:
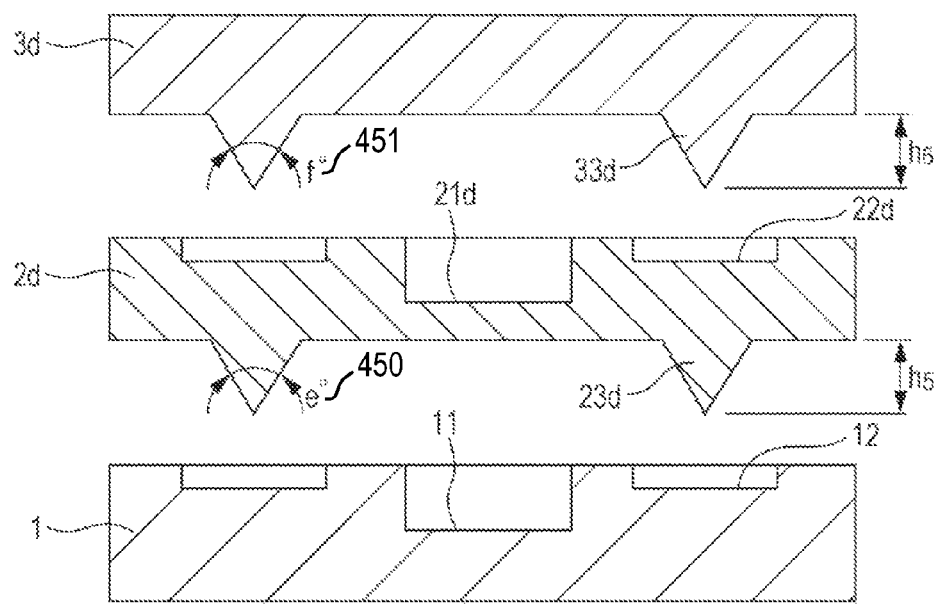
FIGS. 21A and 21B are cross-sectional views of a flow passage assembly according to a fifth exemplary embodiment of the present invention.
Figure 21B:
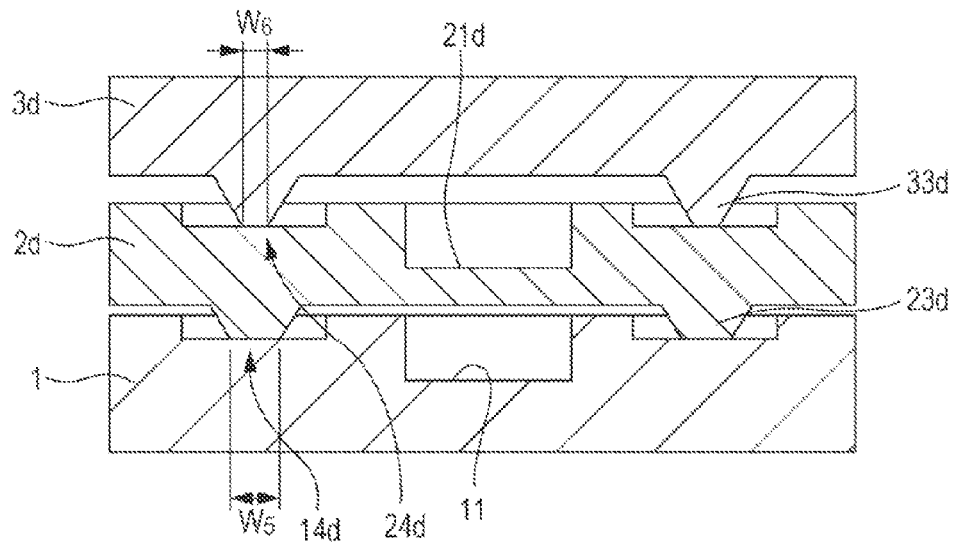

FIGS. 21A and 21B are cross-sectional views of a flow passage assembly according to a fifth exemplary embodiment of the present invention. FIGS. 21A and 21B correspond to FIGS. 14A and 14B illustrating the flow passage assembly according to the second exemplary embodiment, respectively.

The flow passage assembly includes three flat plate members, that is, a first flow passage forming member 1, a second flow passage forming member 2d, and a third flow passage forming member 3d. The first flow passage forming member 1 of the flow passage assembly according to the present exemplary embodiment is the same as the first flow passage forming member 1 according to the second exemplary embodiment. The second flow passage forming member 2d differs from the flow passage forming member 2 according to the second exemplary embodiment in that it has a welding rib having a different shape. The third flow passage forming member 3d differs from the flow passage forming member 3 according to the second exemplary embodiment in that it has a welding rib having a different shape.

Like the welding ribs 23 and 33 according to the second exemplary embodiment, welding ribs 23d of the flow passage forming member 2d and welding ribs 33d of the flow passage forming member 3d have cross sections that are perpendicular to the length direction and that have the same shape throughout their length. Each of the welding ribs 23d and 33d has a cross section forming an isosceles triangle shape. The apex of the isosceles triangle is oriented downward. According to the present exemplary embodiment, the apex angle e° 450 of the welding rib 23d is larger than the apex angle f° 451 of the welding rib 33d. That is, e° 450>f° 451. In addition, the height $h_5$ of the welding rib 23d from the bottom surface of the flow passage forming member 2d is greater than the height $h_6$ of the welding rib 3d from the bottom surface of the flow passage forming member 3d. That is, $h_5$>$h_6$.

A groove 22d of the flow passage forming member 2d is formed so as to be similar to the groove 22 of the flow passage forming member 2 according to the second exemplary embodiment. Accordingly, by welding a welding rib 23d into the groove 12 using an ultrasonic welding process, a weld joint 14d can be formed. In addition, by welding a welding rib 33d into the groove 22d, a weld joint 24d can be formed. In this way, the flow passage forming members 1, 2d, and 3d are integrated into one body, and the flow passage assembly illustrated in FIG. 21B is achieved.

According to the present exemplary embodiment, the flow passage assembly can be manufactured using a manufacturing flow that is the same as the manufacturing flow illustrated in FIGS. 16A to 16C.

As illustrated in FIG. 21B, let $W_5$ denote the width of the weld joint 14d between a groove 12 of the flow passage forming member 1 and the welding rib 23d of the flow passage forming member 2d, and let $W_6$ denote the width of a weld joint 24d between the groove 22d of the flow passage forming member 2d and the welding rib 33d of the flow passage forming member 3d.

According to the present exemplary embodiment, the set melt-down amount of the welding rib 23d is about 0.6 mm, and the actual melt-down amount of the welding rib 23d is about 0.7 mm. In addition, the set melt-down amount of the welding rib 33d is about 0.3 mm, and the actual melt-down amount of the welding rib 33d is about 0.4 mm. By controlling the welding horn 4 in this manner, $W_5$ can be made greater than $W_6$ (i.e., $W_5$>$W_6$).

Consequently, the weld strength of the weld joint 14d between the flow passage forming member 1 and the flow passage forming member 2d is stronger than the weld strength of the weld joint 24d between the flow passage forming member 2d and the flow passage forming member 3d. Thus, when, in step B, the welding rib 33d of the flow passage forming member 3d is welded into the groove 22d of the flow passage forming member 2d and if the load is imposed on the weld joint 14d between the flow passage forming member 1 and the flow passage forming member 2d, the welding rib 23d negligibly comes apart from the groove 12.

As described above, in the method for manufacturing the flow passage assembly according to the present exemplary embodiment, the welding rib of the flow passage forming member in a weld joint welded in a preceding step negligibly comes apart. As a result, by using the present manufacturing method, a reliable flow passage assembly can be achieved.

Sixth Exemplary Embodiment

Figure 22:
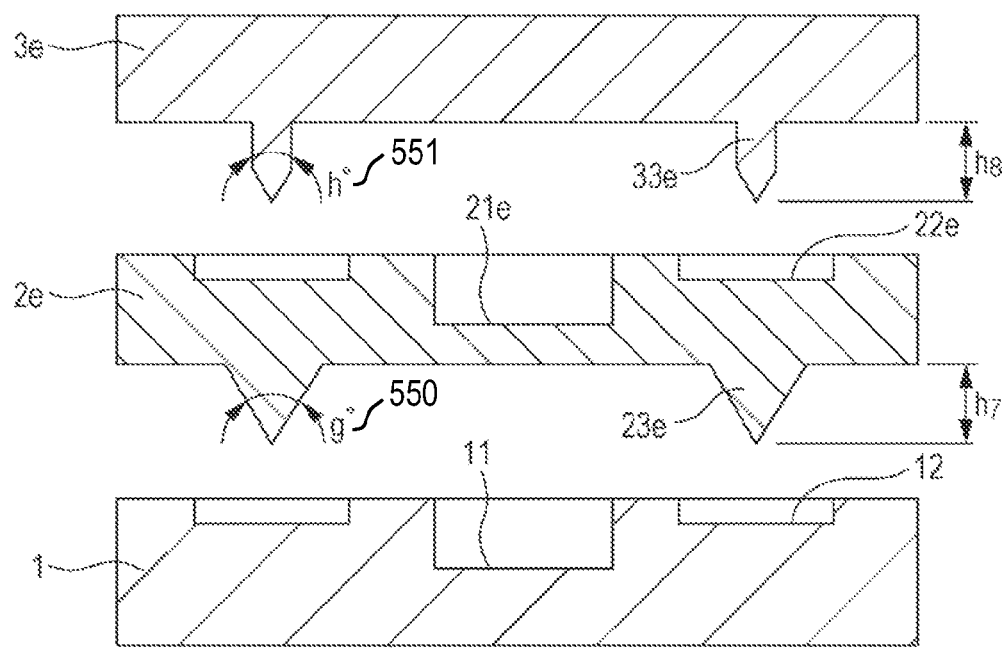
FIG. 22 is a cross-sectional view of a flow passage assembly according to a sixth exemplary embodiment of the present invention.

FIG. 22 is a cross-sectional view of a flow passage assembly according to a sixth exemplary embodiment of the present invention. FIG. 22 corresponds to FIG. 14A illustrating the flow passage assembly according to the second exemplary embodiment.

The flow passage assembly includes three flat plate members, that is, a first flow passage forming member 1, a second flow passage forming member 2e, and a third flow passage forming member 3e. The flow passage forming member 1 of the flow passage assembly according to the present exemplary embodiment is the same as the first flow passage forming member 1 according to the second exemplary embodiment. The second flow passage forming member 2e differs from the flow passage forming member 2 according to the second exemplary embodiment in that it has a welding rib having a different shape. The third flow passage forming member 3e differs from the flow passage forming member 3 according to the second exemplary embodiment in that it has a welding rib having a different shape.

Like the welding ribs 23 and 33 according to the second exemplary embodiment, welding ribs 23e of the flow passage forming member 2e and welding ribs 33e of the flow passage forming member 3e have cross sections that are perpendicular to the length direction and that have the same shape throughout their length. Each of the welding ribs 23e has a cross section forming an isosceles triangle shape. The apex of the isosceles triangle is oriented downward. Each of the welding ribs 33e includes a body having a cross section forming a plate-like portion and a top end having a cross section forming an isosceles triangle. The apex of the isosceles triangle is oriented downward. That is, the welding rib 23e has a cross section forming an arrow shape. At that time, according to the present exemplary embodiment, the apex angle g° 550 of the welding rib 23e is the same as the apex angle h° 551 of the welding rib 33e. That is, g° 550=h° 551. In addition, the height $h_7$ of the welding rib 23e from the bottom surface of the flow passage forming member 2e is the same as the height $h_8$ of the welding rib 33e from the bottom surface of the flow passage forming member 3e. That is, $h_7=h_8$.

A groove 22e of the flow passage forming member 2e is formed so as to be similar to the groove 22 of the flow passage forming member 2 according to the second exemplary embodiment. Accordingly, by welding the welding ribs 23e into the grooves 12 using an ultrasonic welding process, a weld joint 14e can be formed. In addition, by welding the welding ribs 33e into the grooves 22e, a weld joint 24e can be formed. In this way, the flow passage forming members 1, 2e, and 3e are integrated into one body, and a flow passage assembly is achieved.

According to the present exemplary embodiment, the flow passage assembly can be manufactured using a manufacturing flow that is the same as the manufacturing flow illustrated in FIGS. 16A to 16C.

According to the present exemplary embodiment, the setting conditions of the welding horn 4 (a period of time during which the welding horn 4 generates ultrasonic vibration and the ultrasonic energy generated by the welding horn 4) used in step A in which the first flow passage forming member 1 is welded to the second flow passage forming member 2e is the same as those used in step B in which the second flow passage forming member 2e is welded to the third flow passage forming member 3e. More specifically, each of the set melt-down amounts of the welding ribs 23e and 33e is about 0.4 mm. Note that each of the actual melt-down amounts of the welding ribs 23e and 33e is about 0.5 mm.

In the present exemplary embodiment, the melt-down amounts of the welding ribs 23e and 33e are the same, and a melted portion of the welding rib 33e reaches the plate-like portion. Accordingly, a melted amount of the welding rib 23e is larger than a melted amount of the welding rib 33e.

Consequently, the weld strength of the weld joint 14e between the flow passage forming member 1 and the flow passage forming member 2e is stronger than the weld strength of the weld joint 24e between the flow passage forming member 2e and the flow passage forming member 3e. Thus, when, in step B, the welding ribs 33e of the flow passage forming member 3e are welded into the grooves 22e of the flow passage forming member 2e and if the load is imposed on the weld joint 14e between the flow passage forming member 1 and the flow passage forming member 2e, the welding rib 23e negligibly comes apart from the groove 12.

As described above, in the method for manufacturing the flow passage assembly according to the present exemplary embodiment, the welding rib of the flow passage forming member in a weld joint welded in a preceding step negligibly comes apart. As a result, by using the present manufacturing method, a reliable flow passage assembly can be achieved.

Seventh Exemplary Embodiment

Figure 23A:
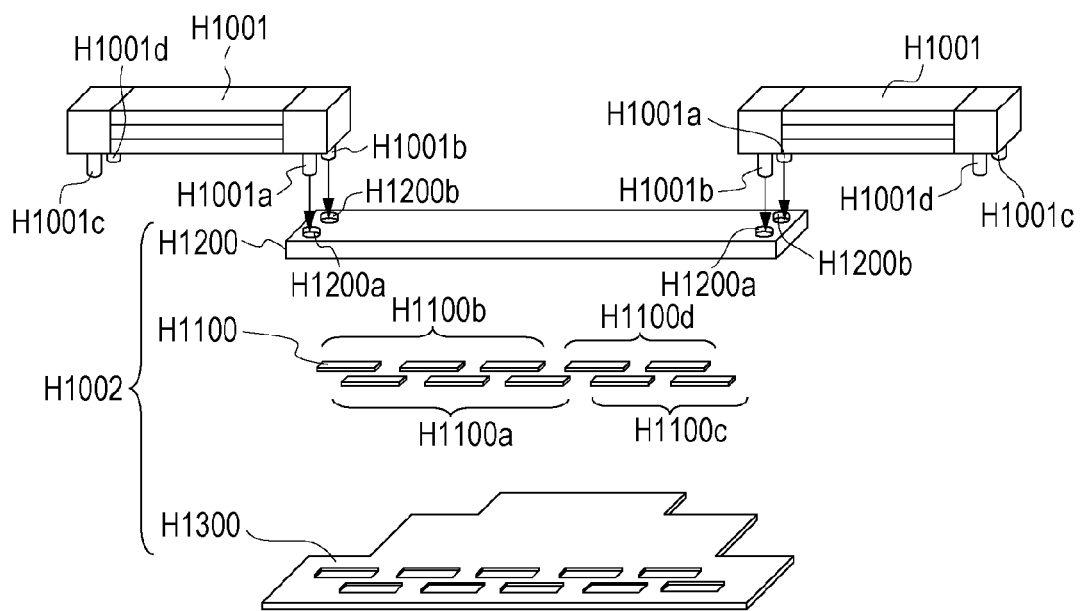
FIGS. 23A and 23B are perspective views of an inkjet recording head according to a seventh exemplary embodiment of the present invention.
Figure 23B:
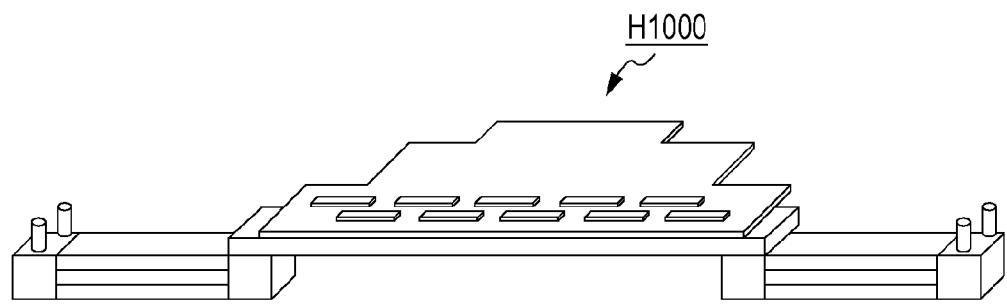

FIGS. 23A and 23B are schematic illustrations of an inkjet recording head according to a seventh exemplary embodiment of the present invention. FIG. 23A is an exploded perspective view of the inkjet recording head, and FIG. 23B is a perspective view of the inkjet recording head.

According to the present exemplary embodiment, an inkjet recording head H1000 includes recording element substrates H1100, a recording element unit H1002 formed from a supporting member H1200 and an electric wiring board H1300, and a flow passage assembly H1001 according to the first exemplary embodiment.

Each of the recording element substrate H1100 is formed from a silicon substrate. The recording element substrate H1100 has an ink supply port in the middle thereof. In addition, the recording element substrate H1100 has a plurality of heat elements arranged thereon. The recording element substrate H1100 having such heat elements is referred to as a "heater board". The heater board has a wire for supplying electric power to the heat elements. The wire is connected to electrode pads disposed on either side of the heater board. An orifice plate including a plurality of nozzles formed therein is provided on such a heater board. Thus, the recording element substrate H1100 is achieved.

The recording element substrate H1100 is highly accurately bonded to the supporting member H1200. The supporting member H1200 has flow passage holes H1200a and H1200b formed on either side. One of the flow passage assemblies H1001 according to the first exemplary embodiment is connected to the flow passage holes H1200a and H1200b.

Connecting units H1001a and H1001b are formed at one end of each of the flow passage assemblies H1001 according to the first exemplary embodiment. The connecting units H1001a and H1001b are connected to the flow passage holes H1200a and H1200b of the supporting member H1200, respectively. Two flow passage assemblies H1001 are connected to one of the supporting members H1200. The connecting units H1001a and H1001b of each of the flow passage assemblies H1001 are connected to the flow passage holes H1200a and H1200b of the supporting member H1200, respectively. The two flow passage assemblies H1001 are connected to both ends of the supporting member H1200 by, for example, bonding or by screws.

Connecting units H1001c and H1001d are formed at the other end of the flow passage assembly H1001. The connecting units H1001c and H1001d are connected to a printer body (not illustrated).

The electric wiring board H1300 has a wire formed thereon. The wire is used to supply electric power to the heat elements of the recording element substrates H1100. The electric wiring board H1300 is highly accurately bonded to the supporting member H1200. In addition, the recording element substrates H1100 are electrically connected to the electric wiring board H1300 with inner leads using TAB technology. The connecting portions are sealed using a seal material.

In this way, the inkjet recording head H1000 illustrated in FIG. 23B is achieved. In the inkjet recording head H1000, ink is supplied from an ink supply unit of the printer body and is led to the connecting unit H1001a via the connecting unit H1001c of each of the flow passage assemblies H1001 and a flow passage located in the lower portion of the flow passage assembly H1001. Thereafter, the ink enters the flow passage hole H1200a from the connecting unit H1001a of the flow passage assembly H1001.

At the same time, the ink supplied from the ink supply unit of the printer body is led to the connecting unit H1001b via the connecting unit H1001d of the flow passage assembly H1001 and a flow passage located in the upper portion of the flow passage assembly H1001. Thereafter, the ink enters the flow passage hole H1200b from the connecting unit H1001b of the flow passage assembly H1001.

The ink that has entered the supporting member H1200 passes through a flow passage disposed inside of the supporting member H1200. The ink is supplied to the recording element substrate H1100 and is ejected from the nozzle of the recording element substrate H1100 to a recording medium. Note that it is desirable that a filter for blocking a dust particle be disposed in the flow passage through which the ink flows.

By using the compact flow passage assembly H1001 according to the first exemplary embodiment, the size of the inkjet recording head H1000 according to the present exemplary embodiment can be reduced. In addition, the flow passage assembly H1001 does not interfere with the arrangement in which the inkjet recording heads H1000 are arranged in parallel in a direction perpendicular to the length direction. As a result, even when, for example, inkjet recording heads for many colors are arranged in parallel, the inkjet recording heads can be installed in a small space.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-109459 filed May 16, 2011 and No. 2011-154911 filed Jul. 13, 2011, which are hereby incorporated by reference herein in their entirety.

What is claimed is:

1. A method for manufacturing a flow passage assembly, comprising:
   forming a first flow passage in a first joint interface formed by welding a first surface of a first flow passage forming member to a first surface of a second flow passage forming member using an ultrasonic welding process; and
   forming, after the first flow passage is formed, a second flow passage in a second joint interface formed by welding a first surface of a third flow passage forming member to one of a second surface of the first flow passage forming member and a second surface of the second flow passage forming member using an ultrasonic welding process,
   wherein a total area of weld portions used when the first flow passage is formed is greater than a total area of weld portions used when the second flow passage is formed,
   wherein one of the two flow passage forming members that form each of the first joint interface and the second joint interface has a protruding welding rib formed thereon,
   wherein the welding rib is welded using the ultrasonic welding process, and
   wherein a volume of the welding rib located in the first joint interface is greater than a volume of the welding rib located in the second joint interface.

2. The method for manufacturing a flow passage assembly according to claim 1, wherein an ultrasonic energy used when welding is performed for forming the first flow passage is higher than an ultrasonic energy used when welding is performed for forming the second flow passage.

3. The method for manufacturing a flow passage assembly according to claim 1, wherein an apex angle of a top end of the welding rib located in the first joint interface is greater than an apex angle of a top end of the welding rib located in the second joint interface.

4. A method for manufacturing a flow passage assembly, comprising:
   forming a first flow passage in a first joint interface formed by welding a first surface of a first flow passage forming member to a first surface of a second flow passage forming member using an ultrasonic welding process; and
   forming, after the first flow passage is formed, a second flow passage in a second joint interface formed by welding a first surface of a third flow passage forming member to one of a second surface of the first flow passage forming member and a second surface of the second flow passage forming member using an ultrasonic welding process,
   wherein an area per unit length of a weld portion used when the first flow passage is formed is greater than an area per unit length of a weld portion used when the second flow passage is formed,
   wherein one of the two flow passage forming members that form each of the first joint interface and the second joint interface has a protruding welding rib formed thereon,
   wherein the welding rib is welded using the ultrasonic welding process, and wherein a volume of the welding rib located in the first joint interface is greater than a volume of the welding rib located in the second joint interface.

5. The method for manufacturing a flow passage assembly according to claim 4, wherein a period of time during which ultrasonic waves are emitted for welding the weld joint per unit length of the first flow passage is longer than a period of time during which ultrasonic waves are emitted for welding the weld joint per unit length of the second flow passage.

6. A flow passage assembly comprising:
   a first flow passage forming member;
   a second flow passage forming member joined to the first flow passage forming member using an ultrasonic welding process, the second flow passage forming member having at least one first flow passage in a first joint interface formed between a first surface of the first flow passage forming member and a first surface of the second flow passage forming member; and
   a third flow passage forming member joined to a second surface of the second flow passage forming member opposite to the first joint interface using an ultrasonic welding process, the third flow passage forming member having at least one second flow passage in a second joint interface formed between the second surface of the second flow passage forming member and the third flow passage forming member;
   wherein a total area of weld portions used when the first flow passage is formed is greater than a total area of weld portions used when the second flow passage is formed,
   wherein one of the two flow passage forming members that form each of the first joint interface and the second joint interface has a protruding welding rib formed thereon,
   wherein the welding rib is welded using the ultrasonic welding process, and wherein a volume of the welding rib located in the first joint interface is greater than a volume of the welding rib located in the second joint interface.

7. The flow passage assembly according to claim 6, further comprising:
a recording head disposed on a second surface of the first flow passage forming member, the recording head ejects a liquid.

8. The flow passage assembly according to claim 6, wherein the number of the first flow passages is greater than the number of the second flow passages.

9. A flow passage assembly comprising:
a first flow passage forming member;
a second flow passage forming member joined to the first flow passage forming member using an ultrasonic welding process, the second flow passage forming member having at least one first flow passage in a first joint interface between a first surface of the first flow passage forming member and a first surface of the second flow passage forming member; and
a third flow passage forming member joined to a second surface of the second flow passage forming member using an ultrasonic welding process, the third flow passage forming member having at least one second flow passage in a second joint interface formed between the second surface of the second flow passage forming member and the third flow passage forming member;
wherein an area per unit length of a weld portion generated when the first flow passage is formed is greater than an area per unit length of a weld portion generated when the second flow passage is formed,
wherein one of the two flow passage forming members that form each of the first joint interface and the second joint interface has a protruding welding rib formed thereon,
wherein the welding rib is welded using the ultrasonic welding process, and wherein a volume of the welding rib located in the first joint interface is greater than a volume of the welding rib located in the second joint interface.

10. The flow passage assembly according to claim 9, further comprising:
a recording head disposed on a second surface of the first flow passage forming member, the recording head ejects a liquid.

11. The flow passage assembly according to claim 9, wherein the number of the first flow passages is greater than the number of the second flow passages.

12. A method for manufacturing a flow passage assembly, comprising:
forming a first flow passage in a first joint interface formed by welding a first surface of a first flow passage forming member to a first surface of a second flow passage forming member using an ultrasonic welding process; and
forming, after the first flow passage is formed, a second flow passage in a second joint interface formed by welding a first surface of a third flow passage forming member to one of a second surface of the first flow passage forming member and a second surface of the second flow passage forming member using an ultrasonic welding process,
wherein one of the two flow passage forming members that form each of the first joint interface and the second joint interface has a protruding welding rib formed thereon,
wherein the welding rib is welded using the ultrasonic welding process, and
wherein a volume of the welding rib located in the first joint interface is greater than a volume of the welding rib located in the second joint interface.

\* \* \* \* \*